(12) United States Patent
Nathan et al.

(10) Patent No.: US 11,556,202 B2
(45) Date of Patent: Jan. 17, 2023

(54) FORCE SENSING TOUCH PANEL

(71) Applicant: Cambridge Touch Technologies Ltd., Cambridge (GB)

(72) Inventors: Arokia Nathan, Cambridge (GB); Michael Astley, Cambridge (GB); Constantinos Tsangarides, Cambridge (GB); Paridhi Sharma, Cambridge (GB); Riccardo Micci, Haddenham (GB); Xiang Cheng, Cambridge (GB); Jiahao Li, Cambridge (GB)

(73) Assignee: Cambridge Touch Technologies Ltd., Cambridge (GB)

( * ) Notice: Subject to any disclaimer, the term of this patent is extended or adjusted under 35 U.S.C. 154(b) by 0 days.

(21) Appl. No.: 17/436,545

(22) PCT Filed: Mar. 13, 2020

(86) PCT No.: PCT/GB2020/050645
§ 371 (c)(1),
(2) Date: Sep. 3, 2021

(87) PCT Pub. No.: WO2020/183194
PCT Pub. Date: Sep. 17, 2020

(65) Prior Publication Data
US 2022/0171489 A1     Jun. 2, 2022

(30) Foreign Application Priority Data
Mar. 13, 2019 (GB) ...................................... 1903459

(51) Int. Cl.
*G06F 3/041* (2006.01)
*G06F 3/044* (2006.01)

(52) U.S. Cl.
CPC .......... *G06F 3/0414* (2013.01); *G06F 3/0412* (2013.01); *G06F 3/0446* (2019.05); *G06F 3/04164* (2019.05); *G06F 2203/04106* (2013.01)

(58) Field of Classification Search
CPC .. G06F 3/0414; G06F 3/0446; G06F 3/04164; G06F 3/0412; G06F 2203/04106
See application file for complete search history.

(56) References Cited

U.S. PATENT DOCUMENTS

| 5,374,787 A | 12/1994 | Miller et al. |
| 6,492,979 B1 | 12/2002 | Kent et al. |

(Continued)

FOREIGN PATENT DOCUMENTS

| GB | 2563601 A | 12/2018 |
| GB | 2565305 A | 2/2019 |

(Continued)

OTHER PUBLICATIONS

International Search Report and Written Opinion, dated May 14, 2020 directed to International application No. PCT/GB2020/050645, 15 pages.

(Continued)

*Primary Examiner* — Peter D McLoone

(57) ABSTRACT

An apparatus (2, 22) is described which includes a touch panel (1, 21). The touch panel (1, 21) includes a layer of piezoelectric material (4) disposed between a number of sensing electrodes (5, 23, 24) and at least one counter electrode (6). The apparatus (2, 22) also includes a touch controller (3) connected to the touch panel (1, 21). The touch controller (3) is configured to determine, in response to receiving piezoelectric signals (7) from one or more of the sensing electrodes (5, 23, 24), a location (9) and an applied force (10) corresponding to a user interaction (11) with the touch panel (1, 21). The touch controller (3) is configured to (Continued)

determine a capacitance value (20) of one or more of the sensing electrodes (5). The touch controller is configured to operate in a force-based mode, a capacitance-based mode or a mixed force-capacitance mode depending on the type of input received.

20 Claims, 11 Drawing Sheets

(56) References Cited

U.S. PATENT DOCUMENTS

| | | | |
|---|---|---|---|
| 8,421,483 B2 | 4/2013 | Klinghult et al. | |
| 8,988,384 B2 | 3/2015 | Krah | |
| 9,417,725 B1 | 8/2016 | Watazu et al. | |
| 9,569,035 B1 | 2/2017 | Lee et al. | |
| 9,575,608 B2 | 2/2017 | Ando et al. | |
| 9,690,408 B1 | 6/2017 | Krah | |
| 9,698,776 B2 | 7/2017 | Toda et al. | |
| 9,891,772 B2 | 2/2018 | Kitada et al. | |
| 9,904,393 B2 | 2/2018 | Frey et al. | |
| 9,983,715 B2 | 5/2018 | Filiz et al. | |
| 10,061,434 B2 | 8/2018 | Nathan et al. | |
| 10,120,477 B2 | 11/2018 | Kitada et al. | |
| 10,120,478 B2 | 11/2018 | Filiz et al. | |
| 10,126,807 B2 | 11/2018 | Nathan et al. | |
| 10,254,894 B2 | 4/2019 | Nathan et al. | |
| 10,282,046 B2 | 5/2019 | Nathan et al. | |
| 10,289,247 B2 | 5/2019 | Nathan et al. | |
| 10,310,659 B2 | 6/2019 | Nathan et al. | |
| 10,318,038 B2 | 6/2019 | Nathan et al. | |
| 10,430,009 B2 | 10/2019 | Nathan et al. | |
| 10,496,210 B2 | 12/2019 | Nathan et al. | |
| 10,599,268 B2 | 3/2020 | Nathan et al. | |
| 10,691,208 B2 | 6/2020 | Toma et al. | |
| 10,739,926 B2 | 8/2020 | Nathan et al. | |
| 10,817,116 B2 | 10/2020 | Bagheri et al. | |
| 10,852,875 B2 | 12/2020 | Routley et al. | |
| 10,928,947 B2 | 2/2021 | Micci et al. | |
| 10,928,950 B2 | 2/2021 | Nathan et al. | |
| 11,093,088 B2 | 8/2021 | Bagheri et al. | |
| 11,221,703 B2 | 1/2022 | Routley et al. | |
| 11,231,801 B2 | 1/2022 | Routley et al. | |
| 11,237,667 B2 | 2/2022 | Nathan et al. | |
| 2005/0174247 A1 | 8/2005 | Kurtz et al. | |
| 2008/0018608 A1* | 1/2008 | Serban | G06F 3/0447 345/173 |
| 2008/0246723 A1* | 10/2008 | Baumbach | G06F 3/0443 345/156 |
| 2009/0254869 A1 | 11/2009 | Ludwig et al. | |
| 2009/0309616 A1 | 12/2009 | Klinghult et al. | |
| 2010/0079384 A1 | 4/2010 | Grivna | |
| 2010/0085322 A1 | 4/2010 | Mamba et al. | |
| 2010/0123686 A1 | 5/2010 | Klinghult et al. | |
| 2010/0309164 A1 | 12/2010 | Yeh et al. | |
| 2011/0096025 A1 | 4/2011 | Elliott et al. | |
| 2011/0102061 A1 | 5/2011 | Wang et al. | |
| 2012/0268416 A1 | 10/2012 | Pirogov et al. | |
| 2013/0176274 A1 | 7/2013 | Sobel | |
| 2013/0265256 A1 | 10/2013 | Nathan et al. | |
| 2014/0008203 A1 | 1/2014 | Nathan et al. | |
| 2014/0022211 A1 | 1/2014 | Karpin et al. | |
| 2014/0049892 A1 | 2/2014 | Huang et al. | |
| 2014/0292699 A1 | 10/2014 | Ando | |
| 2014/0341446 A1 | 11/2014 | Hare et al. | |
| 2014/0354585 A1 | 12/2014 | Cok et al. | |
| 2014/0375580 A1 | 12/2014 | Peshkin et al. | |
| 2015/0130770 A1 | 5/2015 | Takatori | |
| 2015/0168466 A1 | 6/2015 | Park et al. | |
| 2015/0185955 A1 | 7/2015 | Ando et al. | |
| 2015/0199061 A1 | 7/2015 | Kitada et al. | |
| 2015/0253935 A1 | 9/2015 | Toda et al. | |
| 2015/0261344 A1 | 9/2015 | Wigdor | |
| 2015/0234446 A1 | 11/2015 | Nathan et al. | |
| 2015/0331517 A1 | 11/2015 | Filiz et al. | |
| 2015/0346881 A1 | 12/2015 | Watazu | |
| 2015/0355771 A1 | 12/2015 | Watazu et al. | |
| 2016/0034089 A1 | 2/2016 | Kano et al. | |
| 2016/0098131 A1 | 4/2016 | Ogata et al. | |
| 2016/0117034 A1 | 4/2016 | Day | |
| 2016/0124544 A1 | 5/2016 | Kang et al. | |
| 2016/0179276 A1 | 6/2016 | Nathan et al. | |
| 2016/0291729 A1 | 10/2016 | Schardt et al. | |
| 2016/0299625 A1 | 10/2016 | Kano | |
| 2017/0153749 A1 | 2/2017 | Noguchi et al. | |
| 2017/0108973 A1 | 4/2017 | Kim et al. | |
| 2017/0139527 A1 | 5/2017 | Nathan et al. | |
| 2017/0199624 A1 | 7/2017 | Nathan et al. | |
| 2017/0228096 A1 | 8/2017 | Nathan et al. | |
| 2017/0262099 A1 | 9/2017 | Nathan et al. | |
| 2017/0308237 A1 | 10/2017 | Sun et al. | |
| 2017/0364193 A9 | 12/2017 | Nathan et al. | |
| 2017/0371470 A1 | 12/2017 | Nathan et al. | |
| 2018/0081466 A1 | 3/2018 | Moon | |
| 2018/0088718 A1 | 3/2018 | Liu et al. | |
| 2018/0143728 A1 | 5/2018 | Withers et al. | |
| 2018/0183438 A1 | 6/2018 | Shigetaka et al. | |
| 2018/0260065 A1 | 9/2018 | Huang et al. | |
| 2018/0307365 A1 | 10/2018 | Chen et al. | |
| 2018/0335846 A1 | 11/2018 | Toma et al. | |
| 2019/0050080 A1 | 2/2019 | Bagheri et al. | |
| 2019/0064998 A1* | 2/2019 | Chowdhury | G06F 3/044 |
| 2019/0087046 A1* | 3/2019 | Guo | G06F 3/0445 |
| 2019/0114001 A1 | 4/2019 | Mugiraneza et al. | |
| 2019/0227649 A1 | 7/2019 | Micci et al. | |
| 2019/0286263 A1 | 9/2019 | Bagheri et al. | |
| 2019/0361559 A1 | 11/2019 | Guo et al. | |
| 2020/0026409 A1 | 1/2020 | Sagawai | |
| 2020/0218384 A1 | 7/2020 | Guo et al. | |
| 2020/0388913 A1* | 12/2020 | Chai | G06F 3/04164 |
| 2021/0055832 A1 | 2/2021 | Bagheri | |
| 2021/0124458 A1 | 4/2021 | Marques et al. | |
| 2021/0141507 A1 | 5/2021 | Micci et al. | |
| 2021/0263633 A1 | 8/2021 | Astley et al. | |
| 2021/0373698 A1 | 12/2021 | Astley et al. | |

FOREIGN PATENT DOCUMENTS

| | | |
|---|---|---|
| JP | 2010026938 A | 2/2010 |
| JP | 2013131110 A | 7/2013 |
| WO | 2014005218 A1 | 1/2014 |
| WO | 2016102975 A2 | 6/2016 |
| WO | 2017109455 A1 | 6/2017 |
| WO | 2019030513 A1 | 2/2019 |

OTHER PUBLICATIONS

Combined Search and Examination Report under Sections 17 and 18(3) for UK application No. GB1903459.4 dated Sep. 17, 2019, 10 pages.

* cited by examiner

FORCE SENSING TOUCH PANEL

RELATED APPLICATIONS

This application is a 35 U. S. C. § 371 application of PCT Application No. PCT/GB2020/050645, filed Mar. 13, 2020, which claims priority to United Kingdom application GB1903459.4, filed Mar. 13, 2019, each of which is hereby incorporated by reference as if fully disclosed herein.

FIELD OF THE INVENTION

The present invention relates to a touch panel for force sensing.

BACKGROUND

Resistive and capacitive touch panels are used as input devices for computers and mobile devices. One type of capacitive touch panel, projected capacitance touch panels, is often used for mobile devices because an exterior layer may be made of glass, providing a hard surface which is resistant to scratching. An example of a projected capacitance touch panel is described in US 2010/0079384 A1.

Touch panels which use piezoelectric based force-detection have been proposed. For example JP 2010-026938 A describes a touch panel which includes a piezoelectric body layer containing a polyvinylidene fluoride-ethylene tetrafluoride copolymer, a first electrode provided on one surface of the piezoelectric body layer, and a second electrode provided on the other surface of the piezoelectric body layer.

Examples of touch sensors combining capacitive sensing with piezoelectric based force-detection capabilities are described in WO 2016/102975 A1. Further examples of touch sensors combining capacitive sensing with piezoelectric based force-detection capabilities are described in WO 2017/109455 A1.

SUMMARY

According to a first aspect of the invention, there is provided apparatus which includes a touch panel. The touch panel includes a layer of piezoelectric material disposed between a number of sensing electrodes and at least one counter electrode. The apparatus also includes a touch controller connected to the touch panel. The touch controller is configured to determine, in response to receiving piezoelectric signals from one or more of the sensing electrodes, a location and an applied force corresponding to a user interaction with the touch panel.

Each sensing electrode may include one or more sensing pads. Each sensing pad may be opposed across the layer of piezoelectric material by a corresponding counter electrode pad of a counter electrode.

The touch controller may also be configured to determine a capacitance value of one or more of the sensing electrodes.

The touch controller may be configured to determine one or more capacitance values and to receive one or more piezoelectric signals concurrently.

The touch controller may be configured to determine one or more capacitance values and to receive one or more piezoelectric signals sequentially.

The touch controller may be configured, in response to receiving piezoelectric signals and determining no changes in the capacitance values for any of the sensing electrodes, to operate in a force-based mode wherein the touch controller is configured to determine a location and an applied force corresponding to a user interaction based on the piezoelectric signals. The touch controller may be configured, in response to determining changes in the capacitance values of one or more sensing electrodes and receiving no piezoelectric signals, to operate in a capacitance-based mode wherein the touch controller is configured to determine a location corresponding to a user interaction based on the determined changes in capacitance values. The touch controller may be configured, in response to determining changes in the capacitance values of one or more sensing electrodes and receiving piezoelectric signals, to operate in a mixed force-capacitance mode wherein the touch controller is configured to determine a location corresponding to a user interaction based on the determined changes in capacitance values and to determine an applied force corresponding to the user interaction based on the piezoelectric signals.

In the mixed force-capacitance mode, the touch controller may be configured to determine a location corresponding to a user interaction based on the determined changes in the capacitance values and the piezoelectric signals.

The touch controller may also be configured to determine whether the touch panel is wet or submerged based on the determined capacitance values of the sensing electrodes. The touch controller may also be configured, in response to determining that the touch panel is wet, to operate in the force-based mode.

The touch controller may also be configured to operate in the force-based mode in response to determining that a signal-to-noise ratio of the capacitance values is less than a pre-calibrated threshold.

The apparatus may also include a switch configured such that when the touch controller operates in the force-based mode, the switch connects each sensing electrode to a corresponding piezoelectric signal sensing circuit. The switch may be configured such that when the touch controller operates in the mixed force-capacitance mode, the switch connects two or more sensing electrodes to one piezoelectric signal sensing circuit.

The sensing electrodes may include a number of first electrodes and a number of second electrodes. Each first electrode may extend in a first direction, and the first electrodes may be spaced apart in a second direction which is perpendicular to the first direction. Each second electrode may extend in the second direction, and the plurality of second electrodes may be spaced apart in the first direction.

The first and second electrodes may be arranged on the same plane within the touch panel.

The first and second electrodes may be arranged on different, parallel planes within the touch panel.

The touch panel may have a circular or elliptical perimeter. The touch panel may have a square or rectangular perimeter.

The touch panel may be a button input panel. A button input panel may include one or more sensing electrodes in the form of discrete button electrodes. Button electrodes of the button input panel may have different sizes and/or shapes. The counter electrode of the button input panel may be uniform. The counter electrode of the button input panel may be patterned to match the shapes and positions of the button electrodes. Patterned counter electrodes may all be electrically connected to one another. Patterned counter electrodes may be connected to individual conductive traces to enable patterned counter electrodes to be addressed individually. The button input panel may include a light emitting diode layer including one or more light emitting diodes. Each light emitting diode may be disposed and configured to illuminate a corresponding button electrode.

A wearable device may include the apparatus. A wearable device may take the form of a watch, a smart watch, a bracelet, a belt, a buckle, glasses, lenses of glasses, frames of glasses, jewellery, and so forth.

According to a second aspect of the invention, there is provided apparatus which includes a touch panel. The touch panel includes a layer of piezoelectric material disposed between a number of sensing electrodes and one or more counter electrodes. The apparatus also includes a touch controller connected to the touch panel. The touch controller is configured to determine, in response to receiving piezoelectric signals from one or more of the sensing electrodes and/or one or more of the counter electrodes, a location and an applied force corresponding to a user interaction with the touch panel.

The apparatus according to the second aspect may include features corresponding to any features of the apparatus according to the first aspect.

According to a third aspect of the invention there is provided a method for processing signals from a touch panel. The touch panel includes a layer of piezoelectric material disposed between a plurality of sensing electrodes and at least one counter electrode. The method includes, in response to receiving piezoelectric signals from one or more of the sensing electrodes, determining a location corresponding to a user interaction with the touch panel based on the piezoelectric signals.

The method may also include determining a capacitance value of one or more of the sensing electrodes.

Determining capacitance values of one or more of the sensing electrodes may be performed concurrently with receiving piezoelectric signals from one or more of the sensing electrodes.

Determining capacitance values of one or more of the sensing electrodes may be performed sequentially with receiving piezoelectric signals from one or more of the sensing electrodes. Sequentially may include alternating between determining capacitance values and receiving piezoelectric signals.

The method may also include, in response to receiving piezoelectric signals and determining no changes in the capacitance values for any of the sensing electrodes, determining, in a force-based mode, a location and an applied force corresponding to a user interaction based on the piezoelectric signals. The method may also include, in response to determining changes in the capacitance values of one or more sensing electrodes and receiving no piezoelectric signals, determining, in a capacitance-based mode, a location corresponding to a user interaction based on the determined changes in capacitance values. The method may also include, in response to determining changes in the capacitance values of one or more sensing electrodes and receiving piezoelectric signals, determining, in a mixed force-capacitance mode, a location corresponding to a user interaction based on the determined changes in capacitance values and determining an applied force corresponding to the user interaction based on the piezoelectric signals.

In the mixed force-capacitance mode, the location corresponding to a user interaction may be determined based on the determined changes in capacitance values and the piezoelectric signals.

The method may also include determining whether the touch panel is wet or submerged based on the determined capacitance values of the sensing electrodes. The method may also include, in response to determining that the touch panel is wet, operating in the force-based mode.

The method may also include operating in the force-based mode in response to determining that a signal-to-noise ratio of the capacitance values is less than a pre-calibrated threshold.

The touch panel may be a button input panel. A button input panel may include one or more sensing electrodes in the form of discrete button electrodes. Button electrodes of the button input panel may have different sizes and/or shapes. The counter electrode of the button input panel may be uniform. The counter electrode of the button input panel may be patterned to match the shapes and positions of the button electrodes. Patterned counter electrodes may all be electrically connected to one another. Patterned counter electrodes may be connected to individual conductive traces to enable patterned counter electrodes to be addressed individually. The button input panel may include a light emitting diode layer including one or more light emitting diodes. Each light emitting diode may be disposed and configured to illuminate a corresponding button electrode.

According to a fourth aspect of the invention, there is provided a wearable device configured to carry out the method.

According to a fifth aspect of the invention, there is provided a computer program stored on a non-transitory computer readable storage medium. The computer program is configured to cause a data processing apparatus to execute the method.

According to a sixth aspect of the invention there is provided a method for processing signals from a touch panel. The touch panel includes a layer of piezoelectric material disposed between a plurality of sensing electrodes and one or more counter electrodes. The method includes, in response to receiving piezoelectric signals from one or more of the sensing electrodes and/or one or more of the counter electrodes, determining a location corresponding to a user interaction with the touch panel based on the piezoelectric signals.

The method according to the sixth aspect may include features corresponding to any features of the method according to the third aspect.

BRIEF DESCRIPTION OF THE DRAWINGS

Certain embodiments of the present invention will now be described, by way of example, with reference to the accompanying drawings in which.

DETAILED DESCRIPTION

Figure 1:
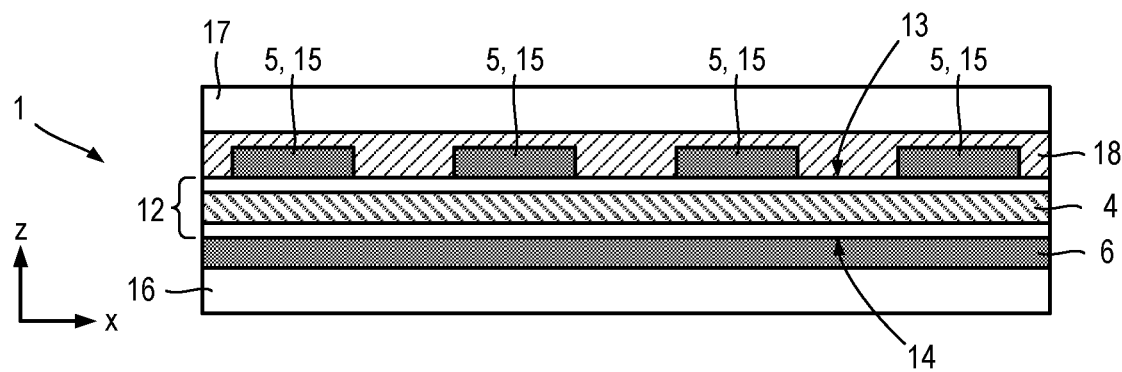
FIG. 1 is a schematic cross-section of a first touch panel.

In the following description, like parts are denoted by like reference numerals.

Projected capacitance touch panels operate by detecting changes in electric fields caused by the proximity of a conductive object. However, when a projected capacitance screen is wet, or fully submerged, the presence of water may cause the determination of a number of and locations of user touches based on capacitance values to become unreliable or entirely non-functional.

Touch panels which operate using combined force sensing and capacitance sensing may use the capacitance measurements to determine the locations of one or more touches. However, such measurements suffer the same issues as a pure capacitive touch panel when wet or submerged underwater. Furthermore, capacitance measurements will not detect a user touch using a non-conductive object, or through most conventional gloves.

The present specification concerns apparatuses and methods which may mitigate one or more of these issues.

First Apparatus

Referring to FIG. 1, a schematic cross section of a display stack-up including a first touch panel 1 is shown.

Figure 2:
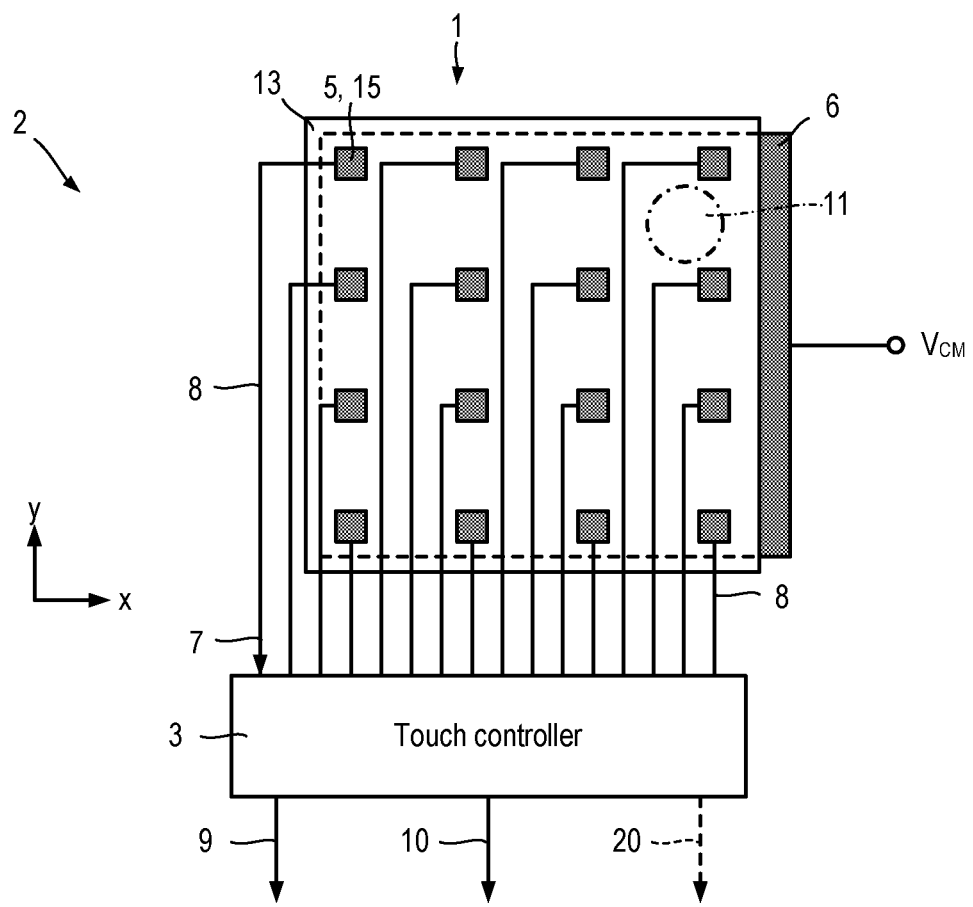
FIG. 2 schematically illustrates a first apparatus.

Referring also to FIG. 2, a first apparatus 2 is shown.

The first apparatus 2 includes the first touch panel 1 and a touch controller 3. In general, the touch panel 1 includes a layer of piezoelectric material 4 disposed between a number of sensing electrodes 5 and at least one counter electrode 6. The touch controller 3 is electrically connected to the sensing electrodes 5 of the touch panel 1. The touch controller 3 is configured to receive piezoelectric signals 7 from one or more of the sensing electrodes 5 via corresponding conductive traces 8. In dependence on the received piezoelectric signals 7, the touch controller 3 is configured to determine a location 9 and an applied force 10 corresponding to a user interaction 11 with the touch panel 1. The touch controller 3 may be configured to amplify and/or filter the piezoelectric signals 7. The touch controller 3 may determine a location 9 and an applied force 10 by interpolating values of the piezoelectric signals 7 to determine an implied position and magnitude of a peak piezoelectric signal, which may correspond to a location 9 between a pair of sensing electrodes 5. The implied magnitude of a peak piezoelectric signal 7 may be mapped to an applied force using calibration data, and the mapping may depend on the location 9 of the user interaction 11. The touch controller may be configured to determine locations 9 and applied forces 10 corresponding to two or more simultaneous (or concurrent) user interactions 11.

By determining locations 9 using only an applied force, the first apparatus 2 may continue to function without interruption even when the touch panel 1 is wet or submerged. Additionally or alternatively, the first apparatus 2 may continue to function even in environments which experience a relatively high level of electromagnetic interference. Such functionality may be particularly advantageous for wearable devices such as smart watches, which are more likely to be worn when swimming, or to become wet from, for example, rain, wet fingers, sweat and so forth. Although smart watches and other devices may be made waterproof, there has been little incentive to use them in wet environments such as, for example, a swimming pool, because a conventional projected capacitance touch panel does not function when wet or submerged.

The first touch panel 1 includes, stacked in a thickness direction z, the counter electrode 6, a first layer structure 12 which includes the layer of piezoelectric material 4, and the sensing electrodes 5. The first layer structure 12 has a first face 13 and a second, opposite, face 14. The first layer structure 12 includes one or more layers, including at least the layer of piezoelectric material 4. Each layer included in the first layer structure 12 is generally planar and extends in first x and second y directions which are perpendicular to a thickness direction z. The one or more layers of the first layer structure 12 are arranged between the first and second faces 13, 14 such that the thickness direction z of each layer of the first layer structure 12 is perpendicular to the first and second faces 13, 14.

The sensing electrodes 5 are disposed on the first face 13 of the first layer structure 12, and the counter electrode 6 is disposed on the second face 14 of the first layer structure 12. Each sensing electrode 5 takes the form of a conductive pad 15. The conductive pads 15 are disposed on the first face 13 in an array extending in the first and second directions x, y. Each sensing electrode 5 in the form of a conductive pad 15 is coupled to a corresponding input of the touch controller 3 by a respective conductive trace 8. The counter electrode 6 is disposed on the second face 14 and is extensive such that the counter electrode 6 at least partial underlies each sensing electrode 5 in the form of a conductive pad 15. The counter electrode 6 may be substantially coextensive with the second face 14. The counter electrode 6 is coupled to a common mode voltage $V_{cm}$, system ground and/or to the touch controller 3 via a return path (not shown).

The first touch panel 1 may be bonded overlying the display 16 of an electronic device such as, for example, a mobile phone, a tablet computer, a laptop computer, a smart watch or other wearable device, and so forth. In such contexts, the materials of the first touch panel 1 should be substantially transparent. A cover lens 17 is typically bonded overlying the first touch panel 1. The cover lens 17 is preferably glass but may be any transparent material including transparent polymers. The cover lens 17 may be bonded to the first touch panel 1 using a layer of pressure sensitive adhesive (PSA) material 18. The layer of PSA material 18 may also be substantially transparent. The array of sensing electrodes 5 and the corresponding conductive traces 8 may be fabricated using index matching techniques to minimise visibility to a user.

The layer of piezoelectric material 4 is a piezoelectric polymer such as polyvinylidene fluoride (PVDF) or polylactic acid (PLLA). However, the layer of piezoelectric material 4 may alternatively be a layer of a piezoelectric ceramic such as lead zirconate titanate (PZT). The sensing electrodes 5 and counter electrode 6 may be formed from indium tin oxide (ITO) or indium zinc oxide (IZO). The sensing electrodes 5 and counter electrode 6 may be formed from metal films such as aluminium, copper, silver or other metals suitable for deposition and patterning as a thin film.

The sensing electrodes 5 and counter electrode 6 may be formed from conductive polymers such as polyaniline, polythiophene, polypyrrole or poly(3,4-ethylenedioxythiophene) polystyrene sulfonate (PEDOT/PSS). The sensing electrodes 5 and counter electrode 6 may be formed from a metal mesh; nanowires, for example silver nanowires; graphene; and/or carbon nanotubes.

The first layer structure 12 may include only the layer of piezoelectric material 4, such that the first and second opposite faces 13, 14 are faces of the layer of piezoelectric material 4. Alternatively, the first layer structure 12 may include one or more dielectric layers 19 (FIG. 3) stacked between the layer of piezoelectric material 4 and the first face 13 of the first layer structure 12. The first layer structure 12 may include one or more dielectric layers 19 (FIG. 3) stacked between the second face 14 of the first layer structure 12 and the layer of piezoelectric material 4. One or more dielectric layer(s) 19 (FIG. 3) may include layers of a polymer dielectric material such as polyethylene terephthalate (PET), or layers of pressure sensitive adhesive (PSA) material. However, one or more dielectric layer(s) 19 (FIG. 3) may include layers of a ceramic insulating material such as aluminium oxide.

The conductive traces 8 may be made of the same material as the sensing electrodes 5. Alternatively, the conductive traces 8 may be made of a material having a higher conductivity than the material used for the sensing electrodes 5. The conductive traces are generally much thinner in the plane defined by the first and second directions x, y than the corresponding sensing electrodes 5.

In the example of the first touch panel 1 shown in FIGS. 1 and 2, the first and second faces 13, 14 and the layers of the first layer structure 12 are shown extending along orthogonal axes labelled x and y, and the thickness direction of each layer of the first layer structure 12 is aligned with an axis labelled z which is orthogonal to the x and y axes. However, the first, second and thickness directions need not form a right handed orthogonal set as shown. For example, the first and second directions x, y may intersect at an angle of 30 degrees or 45 degrees or any other angle greater than 0 degrees and less than 90 degrees.

In some examples, the touch controller 3 may be further configured to determine one or more capacitance values 20, each capacitance value 20 corresponding to one, or a pairing, of the sensing electrodes 5. The touch controller 3 may determine a capacitance value 20 corresponding to each sensing electrode 5 and/or each pairing of sensing electrodes 5.

The touch controller 3 may receive and measure piezoelectric signals 7 and capacitance values 20 concurrently. For example, as described in WO 2017/109455 A1, or as described in WO 2016/102975 A2, and the entire contents of both documents are hereby incorporated by reference. In particular, see the combined force and capacitance touch panel systems shown in, and described with reference to, FIGS. 15 to 20 of WO 2016/102975 A2. Further, suitable combined force and capacitance touch panel systems are shown in, and described with reference to, FIGS. 22 and 23 of WO 2017/109455 A1.

Alternatively, the touch controller 3 may receive and measure piezoelectric signals 7 and capacitance values 20 sequentially, for example, as described in WO 2014/005218 A1, the entire contents or which hereby incorporated by reference. In particular, see the combined force and capacitance touch panel systems shown in, and described with reference to, FIGS. 4 to 6 of WO 2014/005218.

Second Apparatus

Figure 3:
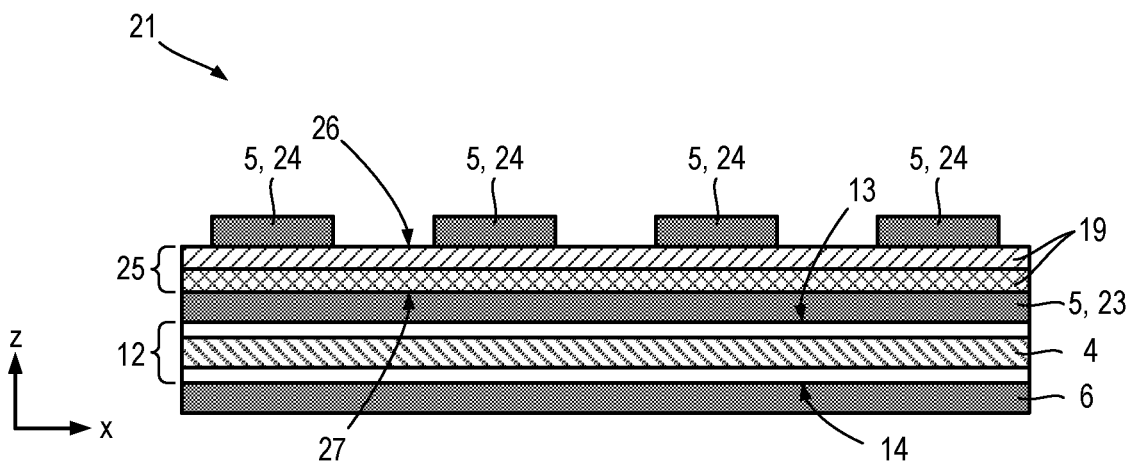
FIG. 3 is a schematic cross-section of a second touch panel.
Figure 4:
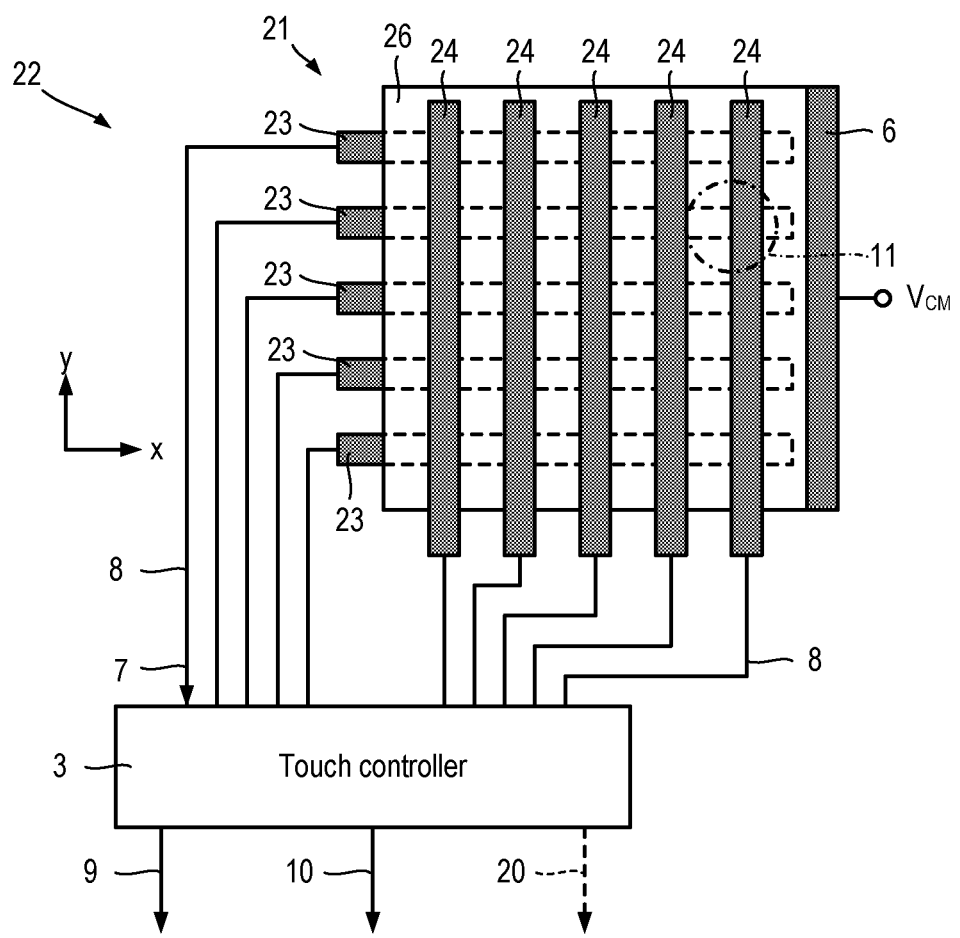
FIG. 4 schematically illustrates a second apparatus.

Referring to FIG. 3, a schematic cross section of a second touch panel 21 is shown. Referring also to FIG. 4, a second apparatus 22 is shown.

The second apparatus 22 includes the second touch panel 21 and the touch controller 3. The touch controller 3 is substantially the same as for the first apparatus 2.

Compared to the first touch panel 1, the sensing electrodes 5 of the second touch panel are divided into first electrodes 23 and second electrodes 24. Additionally, the second touch panel 21 also includes a second layer structure 25. Stacked in the thickness direction, the second touch panel 21 includes the counter electrode 6, the first layer structure 12, the sensing electrodes 5 in the form of first electrodes 23, the second layer structure 25 and the sensing electrodes 5 in the form of second electrodes 24.

The second layer structure 25 has a third face 26 and a fourth, opposite, face 27. The second layer structure 25 includes one or more dielectric layers 19. Each dielectric layer 19 is generally planar and extends in first x and second y directions which are perpendicular to a thickness direction z. The one or more dielectric layers 19 of the second layer structure 25 are arranged between the third and fourth faces 26, 27 such that the thickness direction z of each dielectric layer 18 of the second layer structure 25 is perpendicular to the third and fourth faces 26, 27.

The first electrodes 23 each extend in the first direction x and the first electrodes 23 are disposed in an array evenly spaced in the second direction y. The second electrodes 24 each extend in the second direction y and the second electrodes 24 are disposed in an array evenly spaced in the first direction x. Each first electrode 23 and each second electrode 24 are coupled to a corresponding input of the touch controller 3 by a respective conductive trace 8. The first electrodes 23 may be disposed on the first surface 13 of the first layer structure 12, or on the fourth surface 27 of the second layer structure 25. The second electrodes 24 may be disposed on the third surface 26 of the second layer structure 25, or on the underside of a cover lens 17 bonded over the second touch panel 21. The counter electrode 6 is disposed on the second face 14 and is extensive such that the counter electrode 6 at least partially underlies each first electrode 23 and each second electrode 24. The counter electrode 6 may be substantially coextensive with the second face 14. The counter electrode 6 is coupled to a common mode voltage $V_{cm}$, system ground and/or the touch controller 3.

The touch controller 3 may address each sensing electrode 5, 23, 34 according to a pre-determined or dynamically determined sequence so as to perform a raster scan of the first and second electrodes 23, 24. This may enable the touch controller 3 to determine locations 9 and applied forces 10 corresponding to one or more user interactions 11.

By determining locations 9 using only an applied force, the first apparatus may continue to function without interruption even when the second touch panel 21 is wet or submerged. Additionally or alternatively, the first apparatus 2 may continue to function even in environments which experience a relatively high level of electromagnetic interference. Such functionality may be particularly advantageous for wearable devices such as smart watches, which are more likely to be worn when swimming, or to become wet from, for example, rain, wet fingers, sweat and so forth. Although smart watches and other devices may be made waterproof, there has been little incentive to use them in wet environments such as, for example, a swimming pool, because a conventional projected capacitance touch panel does not function when wet or submerged.

The dielectric layer(s) 19 may include layers of a polymer dielectric material such as PET or layers of PSA materials. However, the dielectric layer(s) 19 may include layers of a ceramic insulating material such as aluminium oxide.

Figure 6:
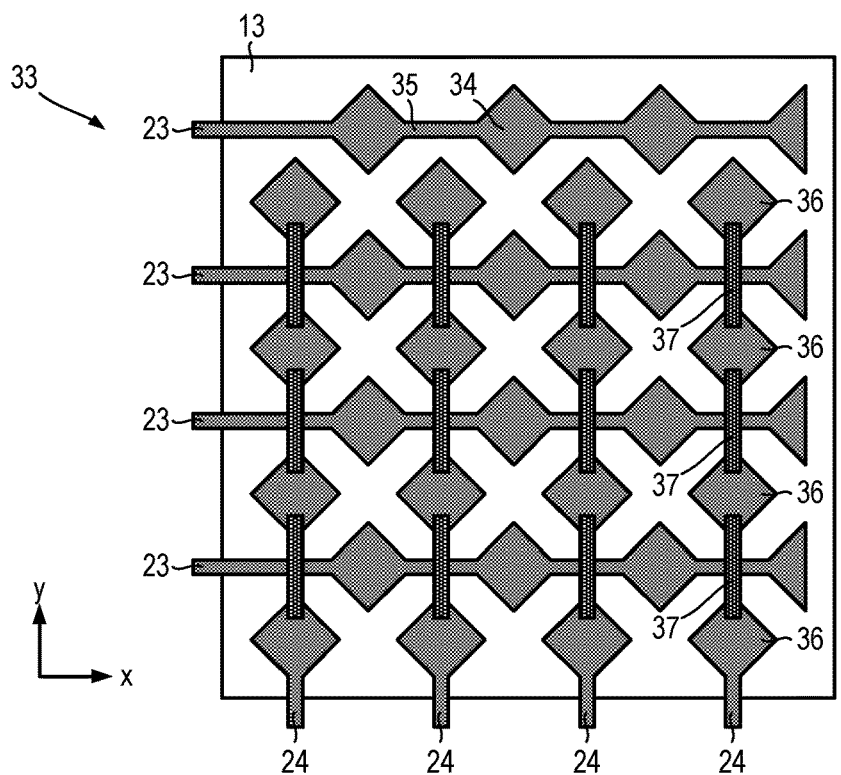
FIG. 6 is a schematic plan-view of a fourth touch panel.

The second layer structure 25 may include only a single dielectric layer 19, such that the third and fourth opposite faces 26, 27 are faces of a single dielectric layer 19. Alternatively, a second layer structure 25 need not be used, and the second electrodes may be disposed on the first face 13 along with the first electrodes 23 (FIG. 6).

In FIGS. 3 and 4, the third and fourth faces 26, 27 and the dielectric layers 19 of the second layer structure 25 are shown extending along orthogonal axes labelled x and y, and the thickness direction of each dielectric layer 19 of the second layer structure 25 is aligned with an axis labelled z which is orthogonal to the x and y axes. However, the first, second and thickness directions x, y, z need not form a right handed orthogonal set as shown.

In the same way as the first apparatus 2, the touch controller 3 of the second apparatus 22 may also determine capacitance values 20. For the first apparatus 2, the capacitance values 20 measured by the touch controller 3 correspond to self-capacitances of the conductive pads 15. For the second apparatus 22, the capacitance values 20 measured by the touch controller 3 may correspond to self-capacitances of the first and second electrodes 23, 24 and/or mutual capacitances between pairings of a first electrode 23 and a second electrode 24.

The touch controller 3 may receive and measure piezoelectric signals 7 and capacitance values 20 concurrently. For example, as described in WO 2017/109455 A1, or as described in WO 2016/102975 A2, and the entire contents of both documents are hereby incorporated by reference. In particular, see the combined force and capacitance touch panel systems shown in, and described with reference to, FIGS. 21 to 26 of WO 2016/102975 A2. Further, suitable combined force and capacitance touch panel systems are shown in, and described with reference to, FIGS. 4 to 21 of WO 2017/109455 A1.

Alternatively, the touch controller 3 may receive and measure piezoelectric signals 7 and capacitance values 20 sequentially, for example, as described in WO 2014/005218 A1, the entire contents or which hereby incorporated by reference. In particular, see the combined force and capacitance touch panel systems shown in, and described with reference to, FIGS. 5 to 8 of WO 2014/005218.

The second touch panel 21 may be bonded overlying the display 16 of an electronic device and a cover lens 17 may be bonded overlying the second touch panel 21 in the same way as for the first touch panel 1.

Third Touch Panel

Although the first and second electrodes 23, 24 have been shown as being substantially rectangular, other shapes can be used.

Figure 5:
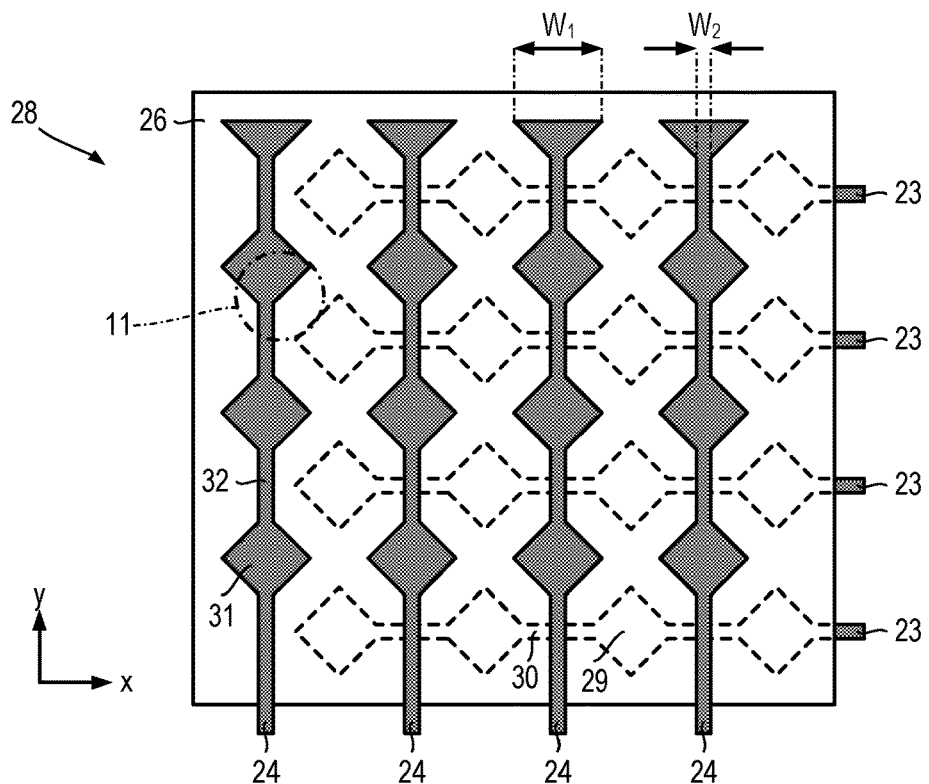
FIG. 5 is a schematic plan-view of a third touch panel.

For example, referring also to FIG. 5, a third touch panel 28 having an alternative arrangement of the first and second electrodes 23, 24 is shown.

Instead of being rectangular, each first electrode 23 may include several first pad segments 29 evenly spaced in the first direction x and connected to one another in the first direction x by relatively narrower first bridging segments 30. Similarly each second electrode 24 may comprise several second pad segments 31 evenly spaced in the second direction y and connected to one another in the second direction y by relatively narrower second bridging segments 32. The first pad segments 29 are diamonds having a first width $W_1$ in the second direction y and the first bridging segments 30 have a second width $W_2$ in the second direction y. The second pad segments 31 and second bridging segments 32 of the second electrodes 24 have the same respective shapes and widths $W_1$, $W_2$ as the first electrodes 23.

The first electrodes 23 and the second electrodes 24 are arranged such that the second bridging segments 32 overlie the first bridging segments 30. Alternatively, the first electrodes 23 and the second electrodes 24 may be arranged such that the second pad segments 31 overlie the first pad segments 29. The pad segments 29, 31 need not be diamond shaped, and may instead be circular. The pad segments 29, 31 may take the form of a regular polygon such as a triangle, square, pentagon or hexagon. The pad segments 29, 31 may be I shaped or Z shaped. The first and second electrodes 23, 24 may take the form of interdigitated, comb-like, snowflake or Manhattan layouts.

In the second apparatus 22, the second touch panel 21 may be exchanged for the third touch panel 28.

Fourth Touch Panel

In the second and third touch panels 21, 28, the first and second electrodes 23, 24 are arranged on different, parallel planes within the touch panels 21, 28. However, in some examples the first and second electrodes 23, 24 may be disposed on substantially the same plane.

For example, referring also to FIG. 6, a fourth touch panel 33 is shown.

The fourth touch panel 33 is substantially the same as the third touch panel 28 except that the fourth touch panel 33 does not include the second layer structure 25 and the second electrodes 24 are disposed on the first face 13 of the first layer structure 12 in addition to the first electrodes 23. Each first electrode 23 is a continuous conductive region extending in the first direction x in the same way as the third touch panel 28. For example, each first electrode 23 may include several first pad segments 34 evenly spaced in the first direction x and connected to one another in the first direction x by relatively narrower first bridging segments 35. Each second electrode 24 may comprise several second pad segments 36 evenly spaced in the second direction y in the same way as the third touch panel 28. However, unlike the third touch panel 28, the second pad segments 36 of the fourth touch panel 33 are disposed on the first face 13 of the first layer structure 12 and are interspersed with, and separated by, the first electrodes 23. The second pad segments 36 are connected together by conductive jumpers 37. The jumpers 37 each span a part of a first electrode 23 and the jumpers 37 are insulated from the first electrodes 23 by a thin layer of dielectric material (not shown) which may be localised to the area around the intersection of the jumper 37 and the first electrode 23.

Alternatively, a thin dielectric layer (not shown) may overlie the first face 13 of the first layer structure 12 and the first and second electrodes 23, 24. Conductive regions (not shown) extending in the second direction y may be disposed over the dielectric layer (not shown), each conductive region (not shown) overlying the second pad segments 36 making up one second electrode 24. The overlying conductive regions (not shown) may connect the second pad segments 36 making up each second electrode 24 using vias (not shown) formed through the dielectric layer (not shown).

In the second apparatus, the second touch panel 21 may be exchanged for the fourth touch panel 33.

Fifth Touch Panel

In the first to fourth touch panels 1, 21, 28, 33, the counter electrode 6 was disposed on, and substantially co-extensive with, the second surface 14 of the first layer structure 12.

However, in some examples the counter electrode 6 may be replaced with one or more patterned counter electrodes.

For example, referring also to FIGS. 7 to 10, a fifth touch panel 38 is shown.

Each sensing electrode 5, 23, 24 of the touch panel 38 takes the form of one or more sensing pads 40, 45, and each sensing pad 40, 45 is opposed across the first layer structure 12 by a corresponding counter electrode pad 43a, 43b of a patterned counter electrode 39a, 39b.

Figure 7:
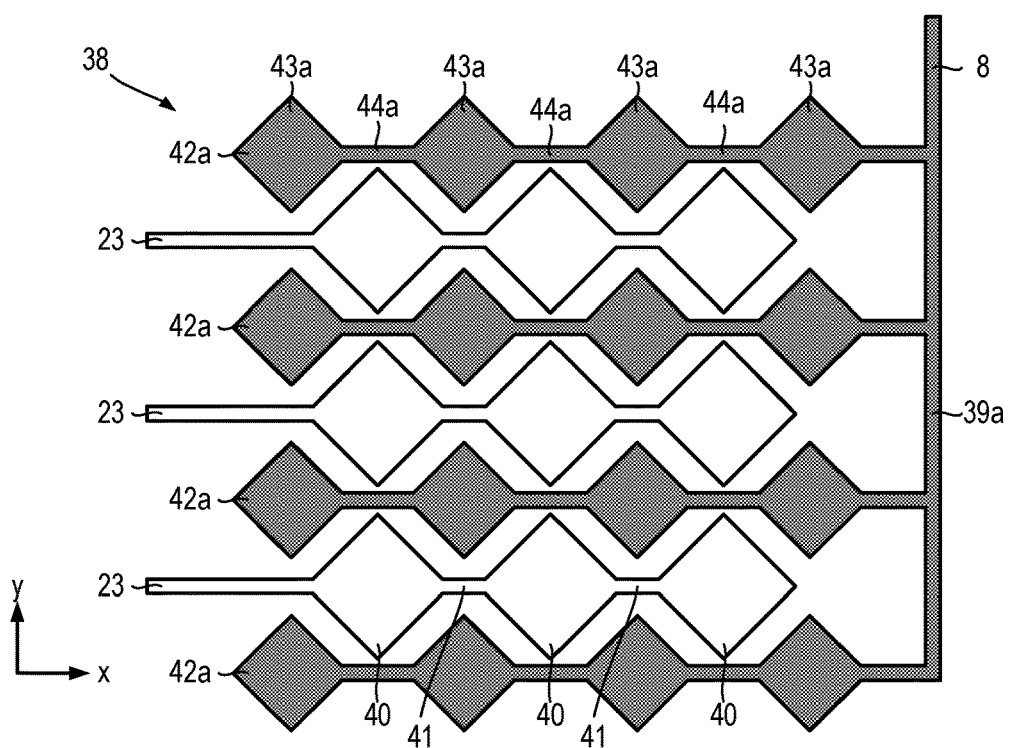
FIG. 7 is a schematic plan-view of first electrodes and a first patterned counter electrode for a fifth touch panel.

Referring in particular to FIG. 7, an arrangement of first electrodes 23 and a first patterned counter electrode 39a is shown.

The first electrodes 23 and first patterned counter electrode 39a are disposed on the second surface 14 of a first layer structure 12. Each first electrode 23 includes several first sensing pads 40 evenly spaced in the first direction x and connected to one another in the first direction x by relatively narrower first bridging segments 41. The first patterned counter electrode 39a includes a number of first branches 42a. The first branches 42a each extend in the first direction x, and the first branches 42a are spaced apart in the second direction y and interdigitated with the first electrodes 23. The first branches 42a are all electrically connected together, for example, the first branches 42a may all connect to a single conductive trace 8 along one or more peripheral edges of the fifth touch panel 38. Each first branch 42a includes several first counter electrode pads 43a evenly spaced in the first direction x and connected to one another in the first direction x by relatively narrower first bridging counter electrode segments 44a.

Figure 8:
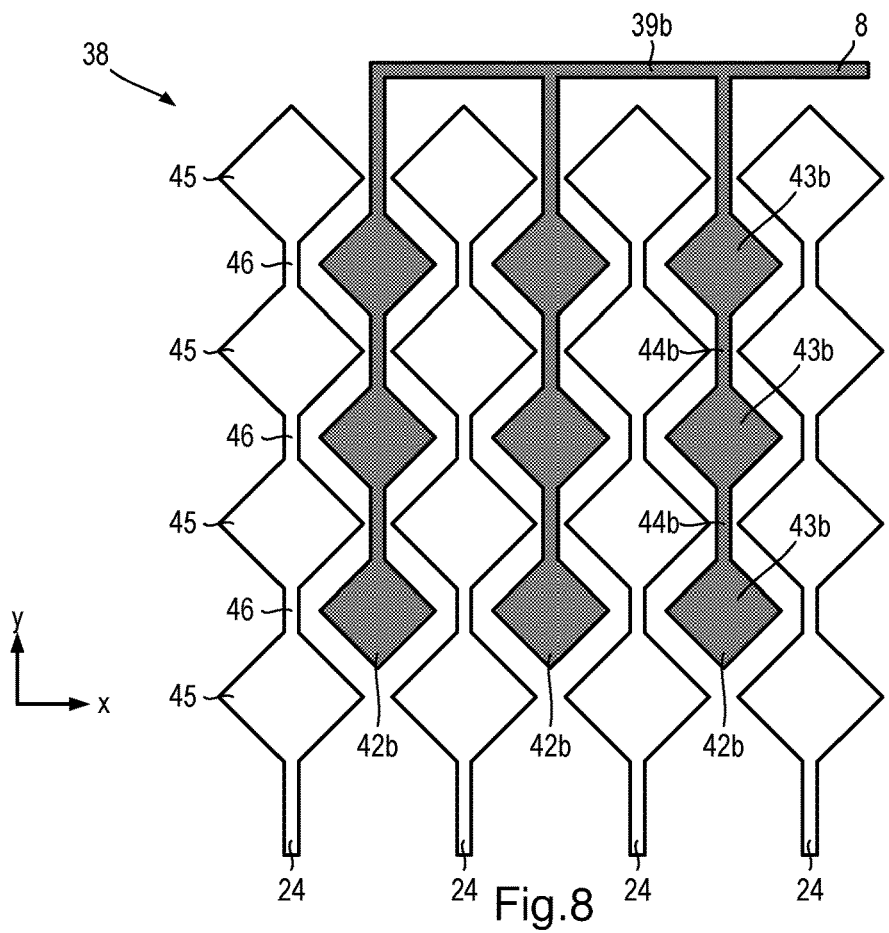
FIG. 8 is a schematic plan-view of second electrodes and a second patterned counter electrode for the fifth touch panel.

Referring in particular to FIG. 8, an arrangement of second electrodes 24 and a second patterned counter electrode 39b is shown.

The second electrodes 24 and second patterned counter electrode 39b are disposed on the first surface 13 of the first layer structure 12. Each second electrode 24 includes several second sensing pads 45 evenly spaced in the second direction y and connected to one another in the second direction y by relatively narrower second bridging segments 46. The second patterned counter electrode 39b includes a number of second branches 42b. The second branches 42b each extend in the second direction y, and the second branches 42b are spaced apart in the first direction x and interdigitated with the second electrodes 24. The second branches 42b are all electrically connected together, for example, the second branches 42b may all connect to a single conductive trace 8 along one or more peripheral edges of the fifth touch panel 38. Each second branch 42b includes several second counter electrode pads 43b evenly spaced in the second direction y and connected to one another in the second direction y by relatively narrower second bridging counter electrode segments 44b.

Figure 9:
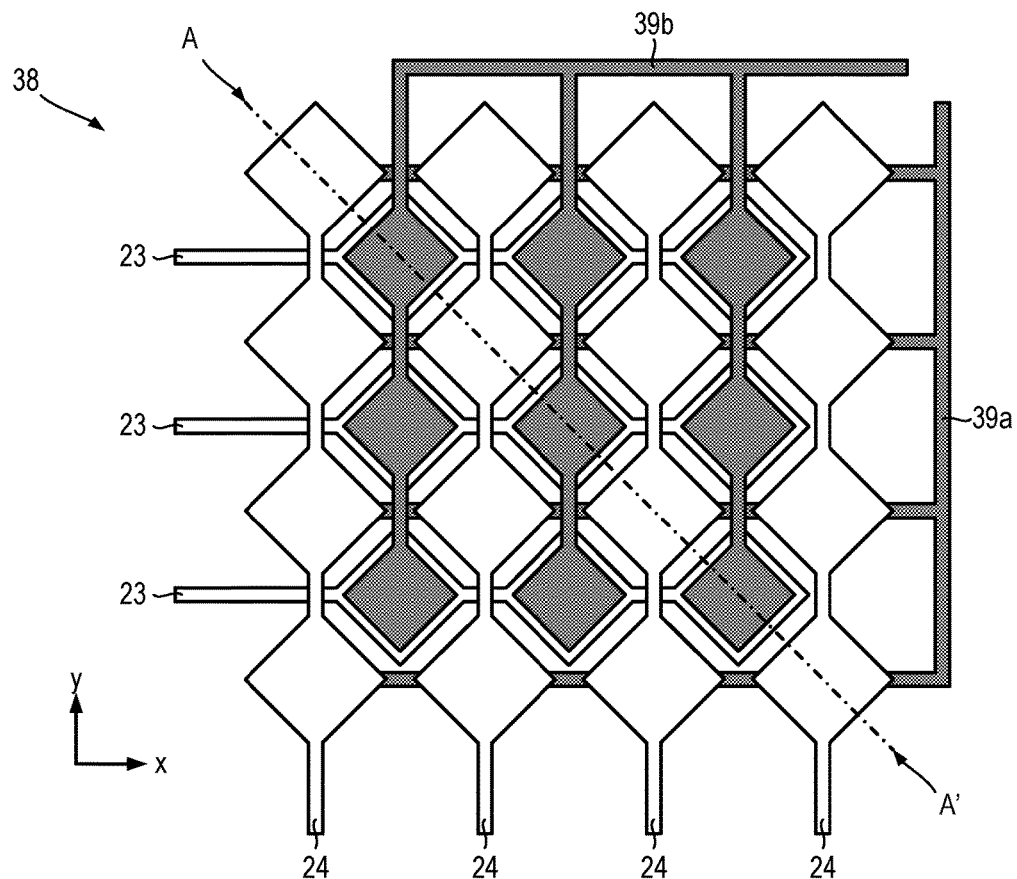
FIG. 9 is a schematic plan-view of the fifth touch panel.
Figure 10:
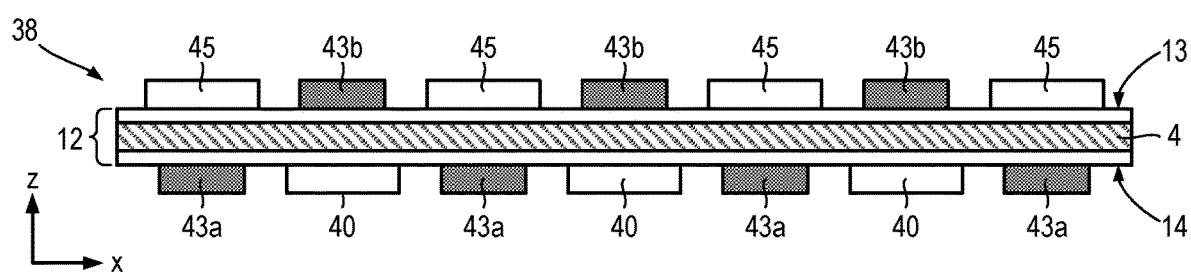
FIG. 10 is a schematic cross-section of the fifth touch panel.

Referring in particular to FIG. 9, a plan view of the fifth touch panel 38 is shown.

The second electrodes 24 and the second patterned counter electrode 39b are arranged over the first electrodes 23 and the first patterned counter electrode 39a. The first layer structure 12 is not shown in FIG. 9 to aid visualisation of the relative positioning of the electrodes 23, 24, 39a, 39b. Each first sensing pad 40 is opposed to a second counter electrode pad 43b across the first layer structure 12. Similarly, each second sensing pad 45 is opposed to a first counter electrode pad 43a across the first layer structure 12.

In this way, the fifth touch panel 38 may be optimised for location sensing using only piezoelectric signals 7, because the capacitance between sensing pads 40, 45 and corresponding counter electrode pads 43a, 43b may be maximised. This may increase the relative size of piezoelectric signals 7, compared to the second, third or fourth touch panels 21, 28, 33. The relative strength of piezoelectric signals 7 may be further increased by using a first layer structure 12 which only includes the layer of piezoelectric material 4.

The sensing pads 40, 45 and the counter electrode pads 43a, 43b are diamond shaped in this example. However, the first sensing pads 40, 45 and counter electrode pads 43a, 43b may alternatively be square, circular, or any other regular or irregular shape. Preferably the sensing pads 40, 45 and the corresponding counter electrode pads 43a, 43b are the same shape. In the example shown in FIGS. 7 to 10, the counter electrode pads 43a, 43b have been drawn with slightly reduced areas compared to the sensing pads 40, 45 for the purposes of visualisation. In examples in which capacitance values are not obtained, each counter electrode pad 43a, 43b may have a shape and area matching the corresponding sensing pad 40, 45 in order to maximise collection of piezoelectric induced charges. In examples in which capacitance values 20 are obtained, the counter electrode pads 43a, 43b which will be closest to an input surface in use may be made relatively smaller in order to reduce the effects of screening of electrical fringing fields between the first and second electrodes 23, 24.

In the second apparatus 22, the second touch panel 21 may be exchanged for the fifth touch panel 38.

In a modification (not shown) of the fifth touch panel 38, the branches 42a, 42b of the patterned counter electrodes need not all be connected to a single conductive trace 8. Instead, each branch 42a, 42b may be connected to the touch controller 3 using a separate conductive trace 8. In such a modification (not shown), instead of measuring applied forces 10 only from the sensing electrodes 5, applied forces 10 may additionally or alternatively be measured using the separately addressable patterned counter electrode branches 42a, 42b. In one example using such a modification (not shown) of the fifth touch panel 38, if the first face 13 is closer to a user, then the second electrodes and branches 42b supported on the first face 13 may be connected to system ground or common mode (to provide electrostatic shielding), whilst applied forces 10 are measured using the first electrodes 23 and branches 42a supported on the second face 14.

First Method of Switching Sensing Modes

Figure 11:
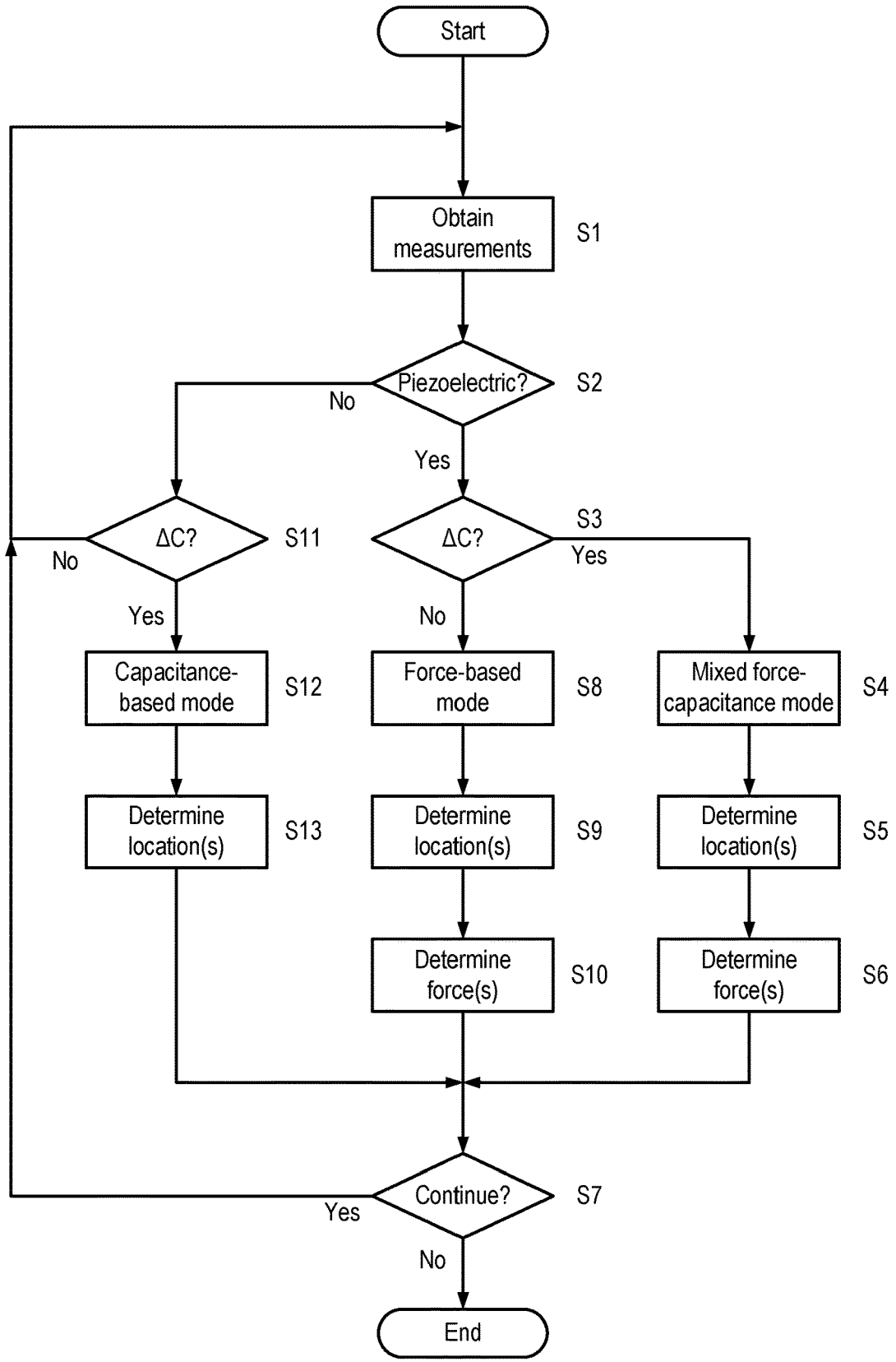
FIG. 11 is a process flow diagram of a first method of switching sensing modes.

Referring also to FIG. 11, a first method of switching sensing modes is shown.

The first method is applicable to apparatuses 2, 22 which implement force and capacitance sensing, whether concurrently or sequentially. The first method may be used in combination with any touch panel 1, 21, 28, 33, 38, which may be used for measurements of force and capacitance.

Measurements of applied force(s) 10 and capacitance values 20 are obtained by the touch controller (step S1). When the apparatus 2, 22 measures force and capacitance concurrently, a single set of applied force(s) 10 and capacitance values 20 may be measured. When the apparatus 2, 22 measures force and capacitance sequentially, one or more applied force(s) 10 may be measured, followed by measurements of the capacitance values 20, or vice versa.

In response to receiving piezoelectric signals 7 (step S2, Yes), it is checked whether there are changes ΔC in the capacitance values 20 (step S3). The reception of piezoelectric signals 7 may correspond to piezoelectric signals 7 exceeding a pre-calibrated minimum piezoelectric signal threshold. As piezoelectric signals 7 are typically transient, checking whether piezoelectric signals 7 are received (step S2) may correspond to checking the time elapsed since piezoelectric signals 7 last exceeded the minimum piezoelectric signal. This condition checks for the application of a detectable force to the touch panel 1, 21, 28, 33, 38. Changes ΔC in the capacitance values 20 may correspond to differences between the capacitance values 20 and a set of baseline capacitance values which exceed minimum capacitance change thresholds. Minimum capacitance change thresholds may be determined upon start-up of the apparatus 2, 22, or may be pre-calibrated. This second condition checks for the presence of a conductive object close to, or touching, the touch panel 1, 21, 28, 33, 38.

If changes ΔC in capacitance values 20 are also detected (step S3, Yes), then the touch controller 3 operates in a mixed force-capacitance mode (step S4). In the mixed force-capacitance mode (step S4), the touch controller 3 is configured to determine a location 9 corresponding to a user interaction 11 based on the determined changes ΔC in capacitance values 20 (step S5), and to determine an applied force 10 corresponding to the user interaction 11 based on the piezoelectric signals. The mixed force-capacitance mode (step S4) corresponds to a user interaction 11 which applies force to a touch panel 1, 21, 28, 33, 38 using a conductive object such as a user's digit or a conductive stylus.

Whilst the first method continues (step S7, Yes), a further set of measurements is obtained (step S1).

Other outcomes are possible. For example, in response to in response to receiving piezoelectric signals (step S2, Yes) and determining no changes ΔC (at least no significant changes ΔC) in capacitance values 20 for any of the sensing electrodes 5 (step S3, No), the touch controller 3 operates in a force-based mode (step S8). In the force-based mode (step S8), the touch controller 3 is configured to determine both a location 9 (step S9) and an applied force 10 (step S10) corresponding to a user interaction 11 based on the piezoelectric signals 7, without any input from capacitance values 20. The force-based mode (step S8) corresponds to a user interaction 11 which applies force to a touch panel 1, 21, 28, 33, 38 using a non-conductive object such as a user's gloved digit or a non-conductive stylus.

In response to receiving no piezoelectric signals 7 (step S2, No), and also determining changes ΔC in capacitance values 20 of one or more sensing electrodes 5 (step S11, Yes), the touch controller 2 operated in a capacitance-based mode (step S12). In the capacitance based mode (step S12), the touch controller 3 is configured to determine a location 9 (step S13) corresponding to a user interaction 11 based on the determined changes ΔC in capacitance values 20. The capacitance-based mode (step S12) corresponds to a user interaction 11 which applies no or negligible force to a touch panel 1, 21, 28, 33, 38 using a conductive object such as a user's digit or a conductive stylus.

In response to receiving no piezoelectric signals 7 (step S2, No), and also determining no changes ΔC in capacitance values 20 (step S11, No), there is no detectable user interaction 11 and the next set of measurements are obtained (step S1).

By differentiating between these different modes (steps S4, S8 or S12), the touch controller 3 may optimise signal processing for the conditions of ongoing user interactions 11. For example, in the mixed force-capacitance mode (step S4), the processing of piezoelectric signals 7 may be optimised for maximum accuracy of determining applied force (s) 10. This may include aggregating piezoelectric signals 7 from one or more groups of sensing electrodes 5. However, in the force-based mode (step S8), the processing of the piezoelectric signals 7 may be optimised for accuracy in determining locations 9 of one or more user interactions 11, for example by treating piezoelectric signal 7 from each sensing electrode 5 separately. In the capacitance-based mode (step S12), piezoelectric signals 7 may be ignored to save processing cycles/power.

In some examples, when the touch controller 3 operates in the mixed force-capacitance mode (step S4), the touch controller 3 may be configured to determine a location 9 corresponding to one or more user interactions 9 based on the determined changes ΔC in capacitance values 20, additionally augmented by the piezoelectric signals 7.

First Method of Switching Sensing Modes

Figure 12:
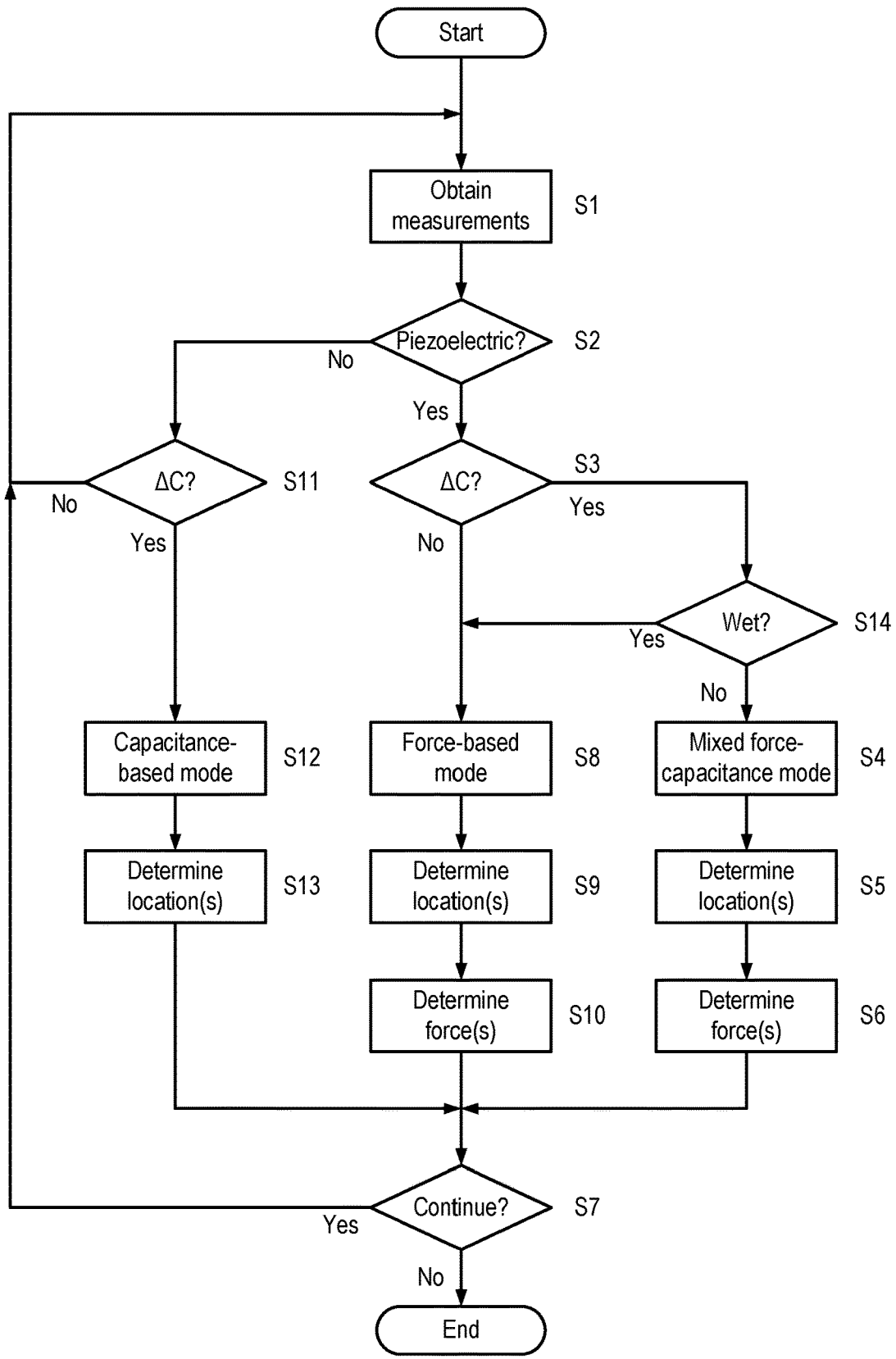
FIG. 12 is a process flow diagram of a second method of switching sensing modes.

Referring also to FIG. 12, a second method of switching sensing modes is shown.

The second method is the same as the first method, except that an additional check (step S14) is conducted before the touch controller 3 operates in mixed force-capacitance mode (step S4).

In particular, in response to receiving piezoelectric signals 7 (step S2, Yes) and measuring changes ΔC in the capacitance values 20 (step S3, Yes), the touch controller also checks whether the touch panel 1, 21, 28, 33, 38 is wet or submerged (step S14). The touch controller 3 may determine whether the touch panel 1, 21, 28, 33, 38 is wet or submerged based on the measured changes ΔC in the capacitance values 20. For example, when the touch panel 1, 21, 28, 33, 38 is wet or submerged, the fraction of sensing electrodes 5 registering changes ΔC and the magnitude of those changes ΔC may be inconsistent with even multiple user interactions 11. Appropriate thresholds may be determined based on calibration experiments conducted by applying progressively more droplets of water to the touch panel 1, 21, 28, 33, 38. Alternatively, measured changes ΔC in the capacitance values 20 corresponding to wet and dry touch panels 1, 21, 28, 33, 38 may be used to train a neural network based classifier.

If the touch panel 1, 21, 28, 33, 38 is wet or submerged (step S14, Yes), the touch controller 3 operates in the force-based mode (step S8), despite the existence of measured changes ΔC in the capacitance values 20. If the touch panel 1, 21, 28, 33, 38 is not wet or submerged (step S14, No), the touch controller 3 operates in the mixed force-capacitance mode (step S4).

In this way, in addition to the effects described hereinbefore in relation to the first method, a touch controller 3 carrying out the second method may avoid unreliable inputs when the touch panel 1, 21, 28, 33, 38 is wet or submerged by using the force-based mode to determine locations 9 of one or more user interactions 11 without relying on the measured changes ΔC in the capacitance values 20.

In other examples, the test for the touch panel 1, 21, 28, 33, 38 being wet or submerged (step S14) may be expanded to encompass further criteria. For example, the touch controller 3 may additionally or alternatively be configured to operate in the force-based mode (step S8) in response to determining that a signal-to-noise ratio for the capacitance values 20 is less than a pre-calibrated threshold. Such relatively high noise environments may be encountered in the in the presence of a high-frequency (10 kHz to 1 MHz) electrical noise environment, for example caused by proximity to a poorly shielded switched-mode power supply.

Piezoelectric Signal Processing

As described hereinbefore, the touch controller 3 may process received piezoelectric signals 7 differently in the force-based and mixed force-capacitance modes. The differences in processing may be differences in processing of digital signals, but may additionally or alternatively correspond to changes in one or more physical connections between the sensing electrodes 5 and the touch controller 3.

The touch controller 3 may include a switch 47 (FIG. 13) configured so that:
1. when the touch controller 3 operates in the force-based mode (step S8), the switch 47 (FIG. 13) connects each sensing electrode 5 to a corresponding piezoelectric signal sensing circuit 48;
2. when the touch controller 3 operates in the mixed force-capacitance mode (step S4), the switch 47 (FIG. 13) connects two or more sensing electrodes 5 to one piezoelectric signal sensing circuit 48.

Each sensing electrode 5 remains coupled to a corresponding capacitance measurement channel 49 (FIG. 13) at all times. The sensing electrodes 5 may be coupled to the capacitance measurement channels 49 (FIG. 13) via high-pass filters, for example capacitances.

In this way, piezoelectric signals 7 from individual sensing electrodes 5 may be processed individually in the force-based mode (step S8) to provide the best possible accuracy in determining locations 9 corresponding to user interactions 11. However, the piezoelectric signals 7 correspond to relatively low currents, and typically require amplification be a significant gain factor. High gain amplification may be relatively noisy and susceptible to interference from external electric fields. By contrast, in the mixed force-capacitance mode (step S4) changes $\Delta C$ in capacitance values 20 are available for determining locations 9. Thus, piezoelectric signals 7 from two or more sensing electrodes 5 (typically adjacent to one another) may be combined in order to increase the relative strength of the signal. Potentially, the amplification gain used may also be decreased.

Figure 13:
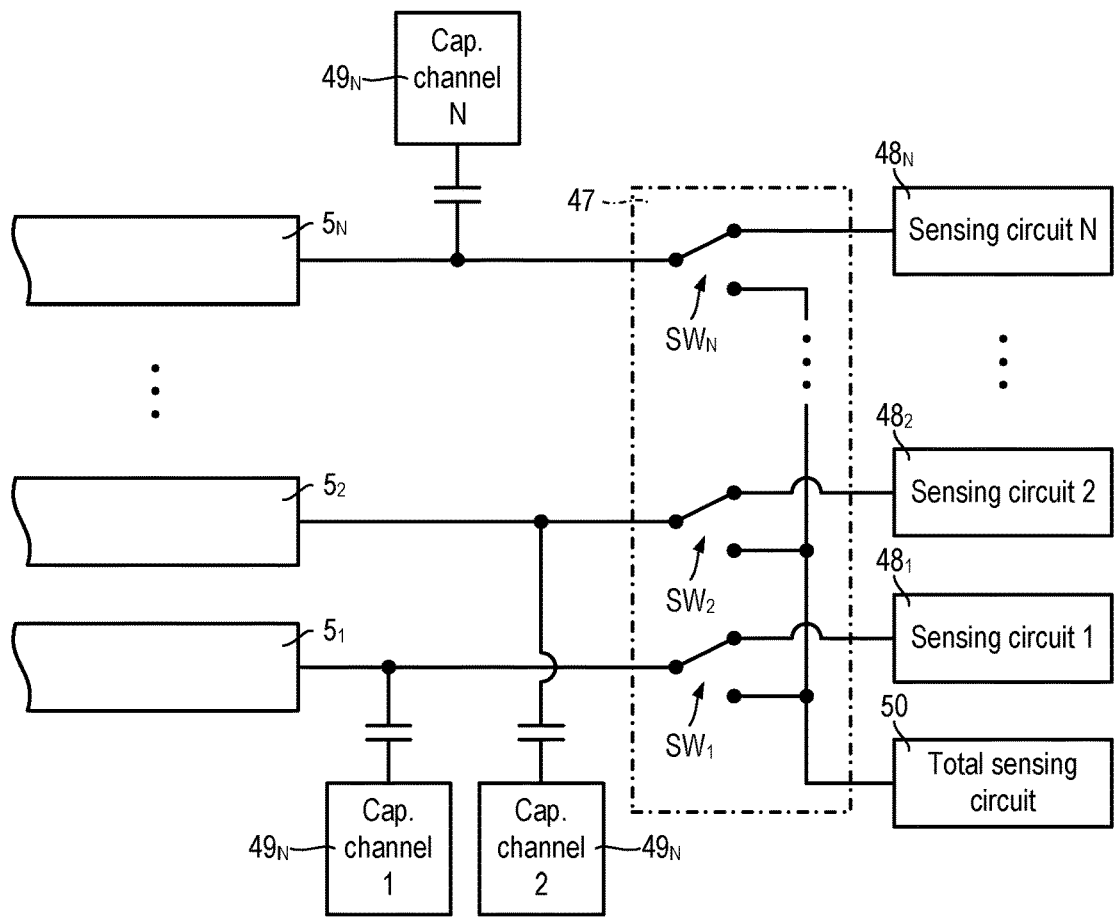
FIGS. 13 and 14 illustrate a first exemplary switching configuration.
Figure 14:
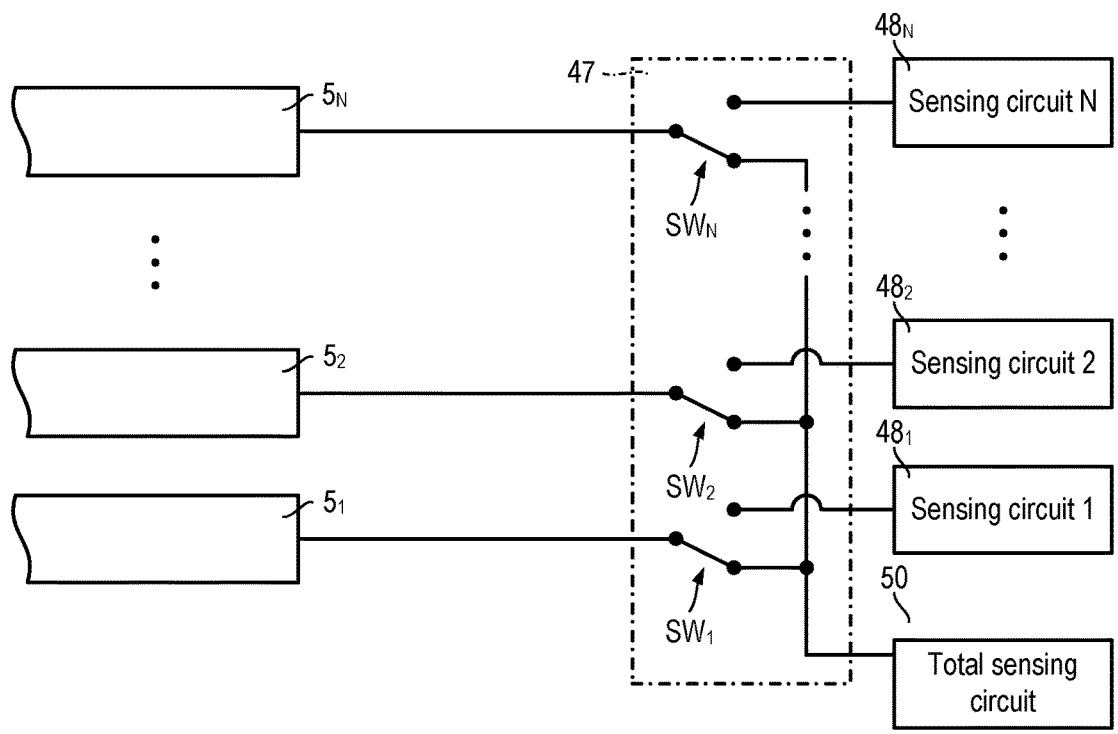

Referring also to FIGS. 13 and 14, a first exemplary switching configuration is shown.

The first switching configuration includes a number, N, of sensing electrodes $5_1, 5_2, \ldots, 5_N$ which are connectable by a switch 47 to either a corresponding number N of piezoelectric signal sensing circuits $48_1, 48_2, \ldots, 48_N$, or to a total piezoelectric signal sensing circuit 50. The switch 47 includes a number N of individual switch elements $SW_1$, $SW_2, \ldots, SW_N$. The $n^{th}$ of N switch elements $SW_n$ may connect the corresponding $n^{th}$ sensing electrode $5_n$ to either the $n^{th}$ piezoelectric signal sensing circuit $48_n$ or to the total piezoelectric signal sensing circuit 50. The capacitive coupling of each sensing electrode $5_1, 5_2, \ldots, 5_N$ to a corresponding capacitance measurement channel $49_1$, $49_2, \ldots, 49_N$ is shown in FIG. 13 for reference, but is not drawn in FIG. 14 as the capacitive coupling does not vary with the mode of the touch controller 3. The capacitance measurement channels $49_1, 49_2, \ldots, 49_N$ are not used in the force-based mode (step S8).

Referring in particular to FIG. 13, when the touch controller 3 operates in the force-based mode (step S8), the switch 47 according to the first exemplary switching configuration connects each sensing electrode $5_n$ to the corresponding piezoelectric signal sensing circuit $48_n$.

Referring in particular to FIG. 14, when the touch controller 3 operates in the mixed force-capacitance mode (step S4), the switch 47 according to the first exemplary switching configuration connects all of the sensing electrodes $5_1$, $5_2, \ldots, 5_N$ to the total piezoelectric signal sensing circuit 50.

Preferably a significant resistance R (not shown in FIG. 13) in the range from about 10 k$\Omega$ to about 100 k$\Omega$ should also be provided in series between each capacitance measurement channel $49_1, 49_2, \ldots, 49_N$ and the corresponding switch elements $SW_1, SW_2, \ldots, SW_N$. These resistances R may act to suppress or block high-frequency coupling of signals between capacitance measurement channels $49_1$, $49_2, \ldots, 49_N$ via the switch elements $SW_1, SW_2, \ldots, SW_N$. As an alternative to additional resistances, whenever a particular capacitance measurement channel $49_n$ is read, the corresponding switch element $SW_n$ may be temporarily opened to isolate the electrode $5_n$ for the duration of measuring a capacitance value 20. When the touch controller 3 performs mutual capacitance measurements, both a transmitting electrode $5_n$ and a receiving electrode $5_k$ (with k an integer 1≤k≤N) may be temporarily isolated for the duration of the measurement using corresponding switch elements $SW_n$, $SW_k$.

Figure 15:
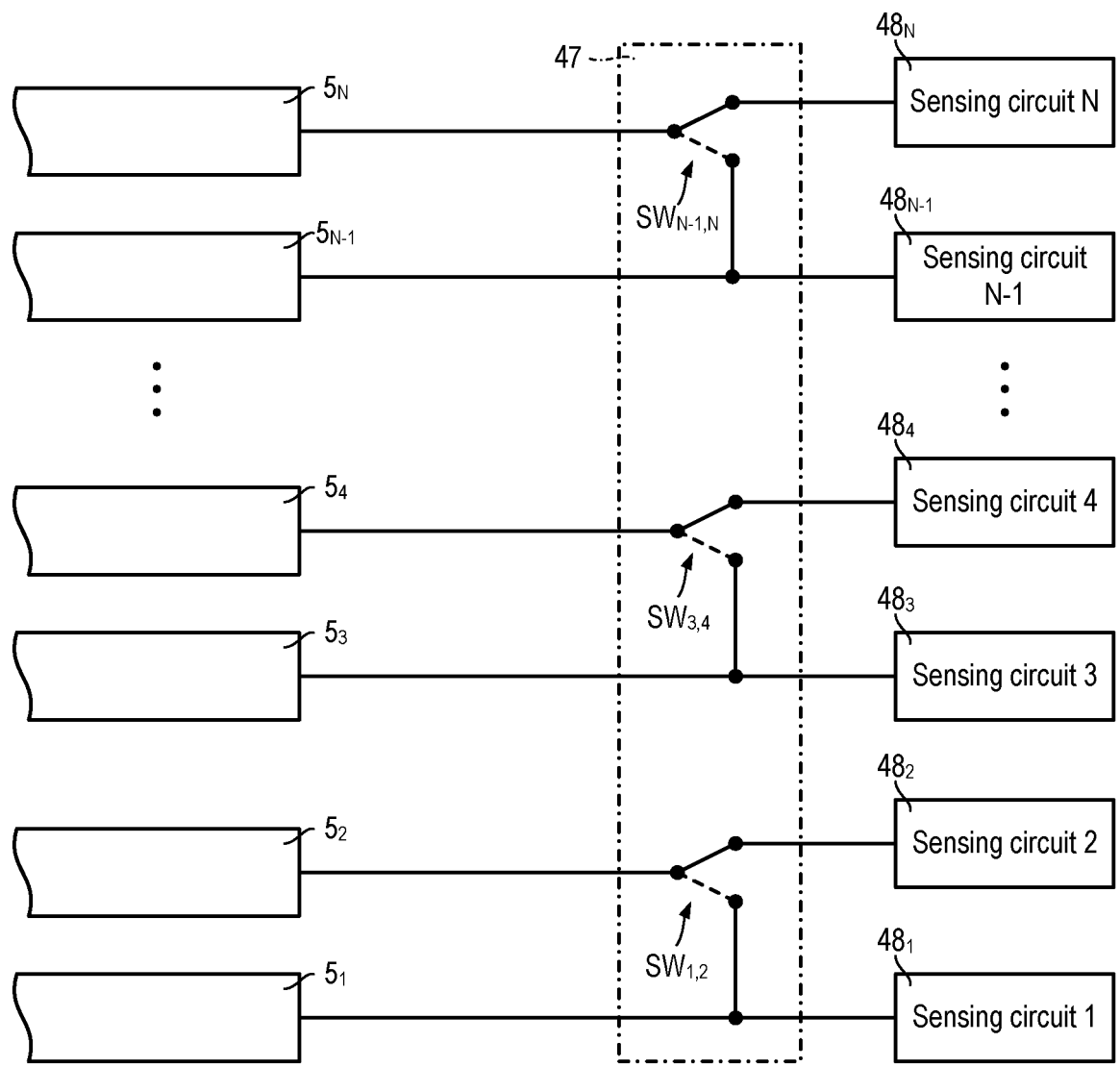
FIG. 15 illustrates a second exemplary switching configuration.

Referring also to FIG. 15, a second exemplary switching configuration is shown.

The second switching configuration includes a number, N, of sensing electrodes $5_1, 5_2, \ldots, 5_N$ which are connectable either individually or in pairs to a corresponding number N of piezoelectric signal sensing circuits $48_1, 48_2, \ldots, 48_N$ by a switch 47. The switch 47 includes a number N/2 of individual switch elements $SW_{1,2}, SW_{3,4}, \ldots, SW_{N-1,N}$. The switch element $SW_{n-1,n}$ may connect the $n-1^{th}$ and $n^{th}$ of N sensing electrodes $5_{n-1}, 5_n$ to the corresponding piezoelectric signal sensing circuits $48_{n-1}, 48_n$, or the switch element $SW_{n-1,n}$ may connect both sensing electrodes $5_{n-1}, 5_n$ to the $n-1^{th}$ piezoelectric signal sensing circuit $48_{n-1}$. The capacitive coupling of each sensing electrode $5_1, 5_2, \ldots, 5_N$ to a corresponding capacitance measurement channel $49_1$, $49_2, \ldots, 49_N$ is not drawn in FIG. 15.

In FIG. 15, the switch 47 is shown corresponding to the force-based mode (step S8) of the touch controller 3. The configuration of the switch elements $SW_{1,2}, SW_{3,4}, \ldots$, $SW_{N-1,N}$ corresponding to the mixed force-capacitance mode (step S4) is indicated in FIG. 15 by dashed lines.

Sixth Touch Panel

Examples of touch panels 1, 21, 28, 33, 38 described hereinbefore have been illustrated with generally square shapes (square perimeters). However, touch panels 1, 21, 28, 33, may have other shaped perimeters, for example rectangular, circular, elliptical, or any other regular or irregular perimeter shape.

Figure 16:
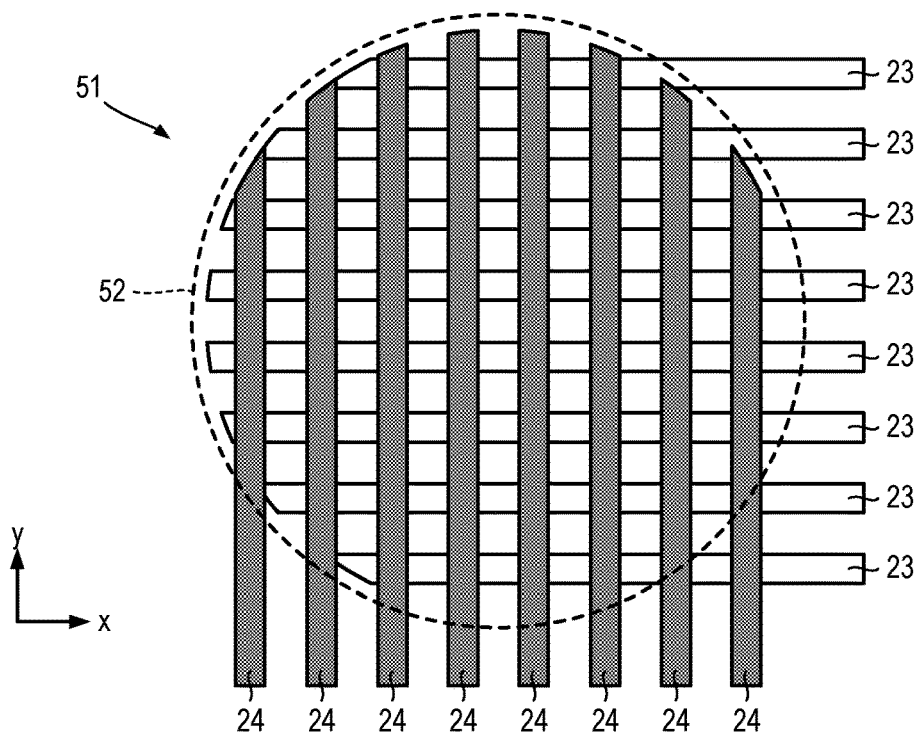
FIG. 16 is a schematic plan-view of a sixth touch panel.

For example, referring also to FIG. 16 a sixth touch panel 51 is shown.

The sixth touch panel 51 is the same as the second touch panel 21, except that the second touch panel 51 has a circular perimeter 52. The second layer structure 25 is not drawn in FIG. 16. The first and second sensing electrodes 23, 24 are truncated at one end by the circular perimeter 52 of the sixth touch panel 51.

Although illustrated as a modification of the second touch panel 21, any hereinbefore described touch panel 1, 21, 28, 33, 38 may be modified to use a circular perimeter 52, or other shaped perimeter.

Seventh Touch Panel

First and second electrodes 23, 24 extending in first and second perpendicular directions need not be used. Sensing electrodes 5 may be disposed according to any suitable coordinate system for determining locations 9 of user interactions 11 with the touch panel 1, 21, 28, 33, 38, 51.

Figure 17:
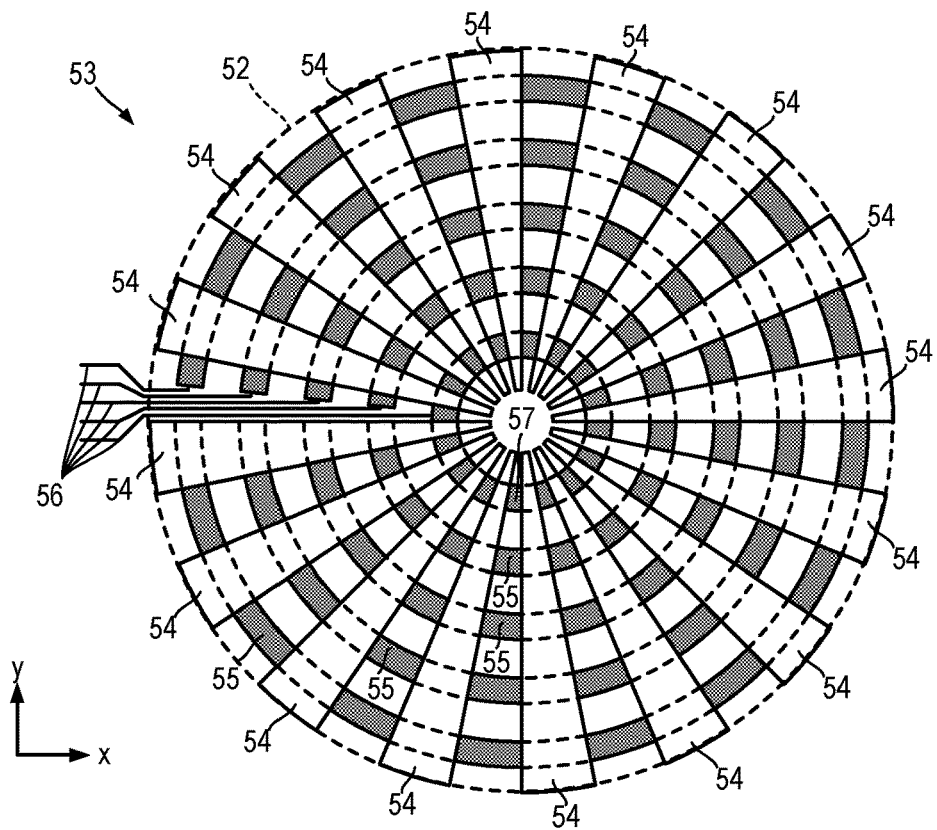
FIG. 17 is a schematic plan-view of a seventh touch panel.

For example, referring also to FIG. 17, a seventh touch panel 53 is shown.

The seventh touch panel 53 is the same as the second to fourth or sixth touch panels 21, 28, 33, 51, except that the first and second electrodes 23, 24 defining a Cartesian grid have been replaced with radial first electrodes 54 and circumferential second electrodes defining a circular polar coordinate system ($\theta$, r). The radial first electrodes 54 measure the angle $\theta$ of a location 9 with respect to the centre of the seventh touch panel 53, and the circumferential second electrodes 55 measure the radius r of a location 9 with respect to the centre of the seventh touch panel 53. The seventh touch panel 53 has a circular perimeter 52.

With appropriate modifications to the first and second patterned counter electrodes 39a, 39b, the fifth touch panel 38 may be modified to employ radial first electrodes 54 and circumferential second electrodes 55.

Modifications

It will be appreciated that many modifications may be made to the embodiments hereinbefore described. Such modifications may involve equivalent and other features which are already known in the design, manufacture and use of touch panels and which may be used instead of or in addition to features already described herein. Features of one embodiment may be replaced or supplemented by features of another embodiment.

Apparatuses 2, 22 and touch panels 1, 21, 28, 33, 38, 51, 53 according to the present specification may be particularly advantageous when incorporated into a wearable device (not shown). For example, because apparatuses 2, 22 and touch panels 1, 21, 28, 33, 38, 51, 53 according to the present specification may operate underwater or when wetted by rain, wet fingers and so forth. A wearable device (not shown) may take the form of a watch, a smart watch, a bracelet, a belt, a buckle, glasses, lenses of glasses, frames of glasses, jewellery, and so forth. When used, the first and second methods of switching sensing modes may allow a wearable device to better handle varied input methods and/or challenging environmental conditions such as, for example, a wet or submerged touch panel 1, 21, 28, 33, 38, 51, 53, and so forth.

For example, a smart watch (not shown) may incorporate a sixth or seventh touch panel 51, 53 and may include a touch controller 3 implementing the second method of switching sensing modes.

Button Input Panel

First to seventh touch panels 1, 21, 28, 33, 38, 51, 53 have been described in which sensing electrode 5 are disposed in regular patterns or arrays. However, the touch controller 3 and associated methods may also be used with touch panels in which sensing electrodes 5 are not disposed in regular patterns or arrays. Instead, the sensing electrodes 5 may be used to provide one or more discrete buttons for use on a control panel of a device.

Figure 18:
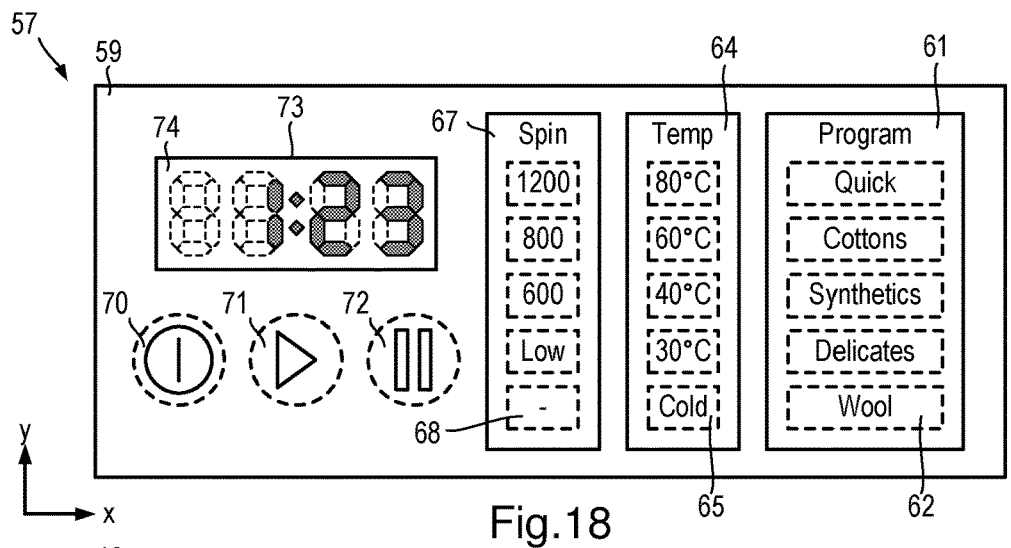
FIG. 18 is a schematic plan-view of a user input surface of a button input panel.
Figure 19:
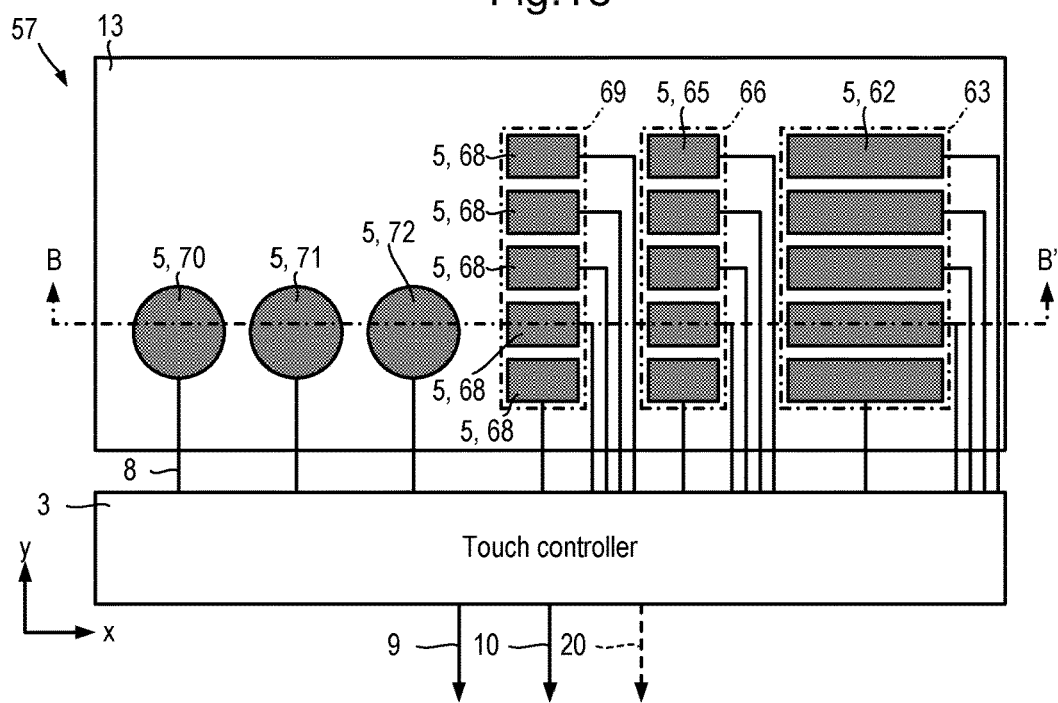
FIG. 19 schematically illustrates connections between sensing electrodes of the button input panel shown in FIG. 18 and a touch controller.
Figure 20:
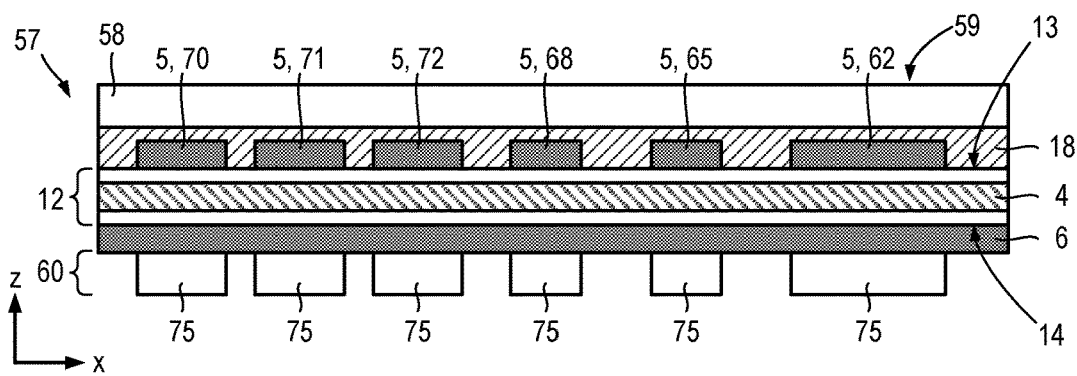
FIG. 20 is a schematic cross-section along the line labelled B-B' in FIG. 19.

Referring also to FIGS. 18 to 20, a button input panel 57 is shown.

The button input panel 57 includes an outer layer 58 providing a user input surface 59, and stacked behind the outer layer 58 are sensing electrodes 5, a first layer structure 12, a counter electrode layer 6 and a light emitting diode (LED) layer 60. The button input panel 57 is a type of touch panel, and unless evidently incompatible, any description hereinbefore relating to touch panel(s) is equally applicable to the button input panel 57.

Referring in particular to FIG. 18, an example of a user input surface 59 is shown. The user input surface 59 shown in FIG. 18 is for a washing machine (not shown), although the button input panel 57 may be readily adapted and applied to any device or machinery which requires or receives user input. Graphics, text or other indicia are printed or otherwise applied to the user input surface 59 (or the other side of the outer layer 58 if transparent) to define regions where a user may interact with the button input panel 57. A "Program" input area 61 is defined, including text corresponding to the different types of washing cycles which the washing machine can run. Each section of text is positioned over a corresponding sensing electrode 5 in the form of a first button electrode 62 belonging to a first group of buttons 63.

Similarly, a "Temp" input area 64 is defined, containing text corresponding to different wash temperatures and overlying sensing electrodes 5 in the form of second button electrodes 65 belonging to a second group of buttons 66. Additionally, a "Spin" input area 67 is defined, containing text corresponding to different spin speeds and overlying sensing electrodes 5 in the form of third button electrodes 68 belonging to a third group of buttons 69. A power button electrode 70 is overlaid by a suitable graphic, as are a start button electrode 71 and a pause button electrode 72.

The user input surface 59 may be generally opaque except for a transparent window 73 which is provided for viewing an underlying display 74. The display 74 may be provided as part of the LED layer 60, for example using one or more organic light emitting diodes (OLEDs), or the display 74 may be a separate device mounted to the underside of the button input panel 57, for example a liquid crystal display or OLED display. Preferably the area corresponding to each button electrode 62, 65, 68, 70, 71, is at least partially translucent to allow particular buttons to be individually illuminable using the LED layer 60. This can allow the actuation status of the button electrodes 62, 65, 68, 70, 71, 72 to be visually indicated, for example, if the currently selected temperature is 60° C., then the second button electrode 65 underlying the text "60° C." may be illuminated whilst all the other buttons electrodes 65 of the second group 66 are not illuminated. To provide these functions, the outer layer 58 may be transparent, and areas other than the transparent window 73 may be printed (for example on the opposite side to the user input surface) using opaque ink. Text or other indicia overlying button electrodes 62, 65, 68, 70, 71, 72 may be defined by omitting the opaque ink, or by using a different, translucent ink.

Referring in particular to FIG. 19, the first face 13 of the first layer structure 12 underlying the outer layer 58 is shown. Each of the button electrodes 62, 65, 68, 70, 71, 72 is connected to the touch controller 3 via a corresponding conductive trace 8. The operation of the touch controller 3 is the same as described hereinbefore. In particular the touch controller 3 measures forces 10 applied to the button electrodes 62, 65, 68, 70, 71, 72, locations 9 in the form of the identities of any actuated button electrodes 62, 65, 68, 70, 71, 72, and optionally self-capacitances of the button electrodes 62, 65, 68, 70, 71, 72.

Referring in particular to FIG. 20, a cross-section of the button input panel 57 is shown corresponding to the line labelled B-B' in FIG. 19. The button input panel 57 has a similar structure to the first touch panel 1, except that the cover lens 17 is replaced by the outer layer 58, the display 16 is replaced by the LED layer 60 and the sensing electrodes 5 have a different pattern. The LED layer 60 includes a light emitting diode (LED) 75 arranged to underlie each of the button electrodes 62, 65, 68, 70, 71, 72 in order to provide illumination indicative of actuating the button electrodes 62, 65, 68, 70, 71, 72. Consequently, the intervening layers of counter electrode 6, first layer structure 12, button electrodes 62, 65, 68, 70, 71, 72 and pressure sensitive adhesive 18 should be transparent or at least translucent. In other examples where the buttons are not required to be illuminable, the LED layer 60 may be omitted. In further examples, a backlight (not shown) may be combined with a liquid crystal array (not shown) to provide selective illumination of the button electrodes 62, 65, 68, 70, 71, 72, and optionally the display 74.

Each LED 75 may single or multi-coloured. When multi-coloured LEDs 75 are used, feedback of force values 10 from the touch controller 3 may be used to alter the colour emitted to illuminate a corresponding button electrode 62, 65, 68, 70, 71, 72 in dependence on the magnitude of a corresponding applied force 10.

The button input panel 57 may employ any of the hereinbefore described methods of switching input modes between capacitance-based, force-based and mixed force-capacitance modes. This may be advantageous in the context of a washing machine, as a user's hands may often be wet, and the ambient environment may often be humid and prone to condensation (e.g. from a tumble dryer machine). In this environment, replacement of mechanical buttons with capacitive buttons alone may not be practical. The devices and methods of the present specification may be used in this environment because even if a user's hands are wet and/or a thin film of condensed water vapour has formed over the user input surface, the force sensing mode may still reliably detect user input.

Although illustrated using a single, continuous counter electrode 6, in other examples a counter electrode layer may be patterned to correspond to the button electrodes 62, 65, 68, 70, 71, 72, for example the second face 14 may be patterned with a number of patterned counter electrodes having an identical layout to that shown in FIG. 19. When such patterned counter electrodes (identical layout to FIG. 19) are used, they may all be connected together so that forces may be measured between any button electrode 62, 65, 68, 70, 71, 72 and the patterned counter electrodes (identical layout to FIG. 19).

Alternatively, each patterned counter electrode (identical layout to FIG. 19) may be connected to a separate conductive trace 8, enabling differential force measurements to be obtained for each individual button electrode 62, 65, 68, 70, 71, 72. In a further example, the touch controller 3 may measure applied forces 10 using the patterned counter electrodes (identical layout to FIG. 19), whilst connecting the corresponding button electrodes 62, 65, 68, 70, 71, 72 to system ground or common mode voltage to provide electrostatic shielding. Counter electrode measurement of force values 10 may be performed in the force-based mode, and/or time multiplexed with capacitance measurements in the mixed force-capacitance Other configurations of a counter electrode layer are possible, for example, a counter electrode layer may include separate electrodes (not shown) corresponding to each of the power, start and pause button electrodes 70, 71, 72, and further electrodes (not shown) each of which is coextensive with one of the first, second and third groups 63, 66, 69 of electrodes. This latter approach represents a hybrid approach in which some button electrodes 70, 71, 72 are opposed by a matching counter electrodes (not shown), whereas each group 63, 66, 69 of electrodes is opposed by a common counter electrode (not shown). Counter electrode 6 measurements of applied force 10 would be possible using such a hybrid approach. For example, whilst an applied force 10 measurement made using a common counter electrode (not shown) for the "Spin" input area 67 could not distinguish between the various options, the touch controller 3 may be configured to cycle through the options each time the common counter electrode (not shown) is actuated. The currently selected option may be indicated by illumination from the LED layer 60.

The display 74 of the button input panel 57 is optional, and in other example may be omitted.

The button input panel 57 is not limited to a washing machine, and with suitable customisation of the number and shape of button electrodes 62, 65, 68, 70, 71, 72 and overlying indicia, may be used in conjunction with any device requiring or receiving user input. Examples of suitable uses include kitchen or other domestic appliances, in-car button controls and/or infotainment screens mounted to a car dashboard, industrial equipment interfaces, medical equipment interfaces, ruggedised outdoor tablets, laptops, point-of-sale units and so forth, parking ticket machine interfaces, outdoor wearable use (e.g. fitness watches), marine equipment interfaces, and so forth. These applications all have in common that a user may be wearing protective gloves (e.g. protective gloves in an industrial setting, latex/nitrile gloves in a clinical setting) which may interfere with capacitive sensing, and/or an input panel may become wet or fully/partially submerged.

Although claims have been formulated in this application to particular combinations of features, it should be understood that the scope of the disclosure of the present invention also includes any novel features or any novel combination of features disclosed herein either explicitly or implicitly or any generalization thereof, whether or not it relates to the same invention as presently claimed in any claim and whether or not it mitigates any or all of the same technical problems as does the present invention. The applicant hereby gives notice that new claims may be formulated to such features and/or combinations of such features during the prosecution of the present application or of any further application derived therefrom.

The invention claimed is:

1. An apparatus comprising:
a touch panel which comprises a layer of piezoelectric material disposed between a plurality of sensing electrodes and at least one counter electrode;
a touch controller connected to the touch panel, and configured to determine, in response to receiving piezoelectric signals from one or more of the plurality of sensing electrodes, a location and an applied force corresponding to a user interaction with the touch panel;
wherein the touch controller is further configured to determine a capacitance value of one or more of the plurality of sensing electrodes;
wherein the touch controller is configured to:
determine whether a first condition is satisfied, the first condition corresponding to the received piezoelectric signals exceeding a minimum piezoelectric signal threshold; and
determine whether a second condition is satisfied, the second condition corresponding to changes in capacitance values exceeding a minimum capacitance change threshold, each change in capacitance values corresponding to a difference between the capacitance value corresponding to one of the one or more of the plurality of sensing electrodes and a respective baseline capacitance value;
the touch controller further configured to:
in a case where the first condition is satisfied and the second condition is not satisfied, operate in a force-based mode wherein the touch controller is configured to determine a location and an applied force corresponding to a user interaction based on the piezoelectric signals;
in a case where the first condition is not satisfied and the second condition is satisfied, operate in a capacitance-based mode wherein the touch controller is configured to determine a location corresponding to a user interaction based on the determined changes in the capacitance values; and
in a case where the first condition is satisfied and the second condition is satisfied, operate in a mixed force-capacitance mode wherein the touch controller is configured to determine a location corresponding to a user interaction based on the determined changes in the capacitance values and to determine an applied force corresponding to the user interaction based on the piezoelectric signals.

2. The apparatus according to claim 1, wherein each of the plurality of sensing electrode comprises one or more sensing pads, and wherein each sensing pad is opposed across the layer of piezoelectric material by a corresponding counter electrode pad of a counter electrode.

3. The apparatus according to claim 1, wherein the touch controller is configured to determine one or more of the capacitance values and to receive one or more of the piezoelectric signals concurrently.

4. The apparatus according to claim 1, wherein the touch controller is configured to determine one or more of the capacitance values and to receive one or more of the piezoelectric signals sequentially.

5. The apparatus according to claim 1, wherein in the mixed force-capacitance mode, the touch controller is configured to determine a location corresponding to a user interaction based on the determined changes in the capacitance values and the piezoelectric signals.

6. The apparatus according to claim 1, wherein the touch controller is further configured to:
determine whether a fraction of sensing electrodes corresponding to the determined changes in the capacitance values of the plurality of sensing electrodes and the magnitude of those changes in the capacitance values are inconsistent with multiple user interactions; and
in response to a positive determination that the fraction of sensing electrodes corresponding to the determined changes in the capacitance values of the plurality of sensing electrodes and the magnitude of those changes in the capacitance values are inconsistent with multiple user interactions, operate in the force-based mode.

7. The apparatus according to claim 1, further comprising a switch configured such that:
when the touch controller operates in the force-based mode, the switch connects each of the plurality of sensing electrode to a corresponding piezoelectric signal sensing circuit; and
when the touch controller operates in the mixed force-capacitance mode, the switch connects two or more of the plurality of sensing electrodes to one piezoelectric signal sensing circuit.

8. The apparatus according to claim 1, wherein the plurality of sensing electrodes includes a plurality of first electrodes and a plurality of second electrodes, wherein:
each of the plurality of first electrode extends in a first direction, and the plurality of first electrodes are spaced apart in a second direction which is perpendicular to the first direction; and
each of the plurality second electrode extends in the second direction, and the plurality of second electrodes are spaced apart in the first direction.

9. The apparatus according to claim 8, wherein the plurality of first and second electrodes are arranged on the same plane within the touch panel.

10. The apparatus according to claim 8, wherein the plurality of first and second electrodes are arranged on different, parallel planes within the touch panel.

11. The apparatus according to claim 1, wherein the touch panel has a perimeter that is circular, elliptical, square or rectangular.

12. The apparatus according to claim 1, wherein the touch panel is a button input panel.

13. The apparatus according to claim 1, wherein the touch controller is further configured to:
determine whether a third condition is satisfied, the third condition corresponding to a signal-to-noise ratio of the capacitance values being less than a pre-calibrated threshold; and
in a case where the third condition is satisfied, operate in the force-based mode.

14. The method according to claim 1, further comprising:
determining whether a third condition is satisfied, the third corresponding to a signal-to-noise ratio of the capacitance values being less than a pre-calibrated threshold; and
in a case where the third condition is satisfied, determining, in the force-based mode, a location and an applied force corresponding to a user interaction based on the piezoelectric signals.

15. A method for processing signals from a touch panel which comprises a layer of piezoelectric material disposed between a plurality of sensing electrodes and at least one counter electrode, the method comprising:
in response to receiving piezoelectric signals from one or more of the plurality of sensing electrodes, determining a location corresponding to a user interaction with the touch panel based on the piezoelectric signals;
determining a capacitance value of one or more of the plurality of sensing electrodes;
determining whether a first condition is satisfied, the first condition corresponding to the received piezoelectric signals exceeding a minimum piezoelectric signal threshold;
determining whether a second condition is satisfied, the second condition corresponding to changes in capacitance values exceeding a minimum capacitance change threshold, each change in capacitance values corresponding to a difference between the capacitance value corresponding to one of the one or more of the plurality of sensing electrodes and a respective baseline capacitance value;
and;
in a case where the first condition is satisfied and the second condition is not satisfied, determining, in a force-based mode, a location and an applied force corresponding to a user interaction based on the piezoelectric signals;
in a case where the first condition is not satisfied and the second condition is satisfied, determining, in a capacitance-based mode, a location corresponding to a user interaction based on the determined changes in the capacitance values;
in a case where the first condition is satisfied and the second condition is satisfied, determining, in a mixed force-capacitance mode, a location corresponding to a user interaction based on the determined changes in the capacitance values, and determining an applied force corresponding to the user interaction based on the piezoelectric signals.

16. The method according to claim 15, wherein determining the capacitance values of one or more of the plurality of sensing electrodes occurs concurrently with receiving the piezoelectric signals from one or more of the plurality of sensing electrodes.

17. The method according to claim 15, wherein determining the capacitance values of one or more of the plurality of sensing electrodes occurs sequentially with receiving the piezoelectric signals from one or more of the plurality of sensing electrodes.

18. The method according to claim 15, wherein in the mixed force-capacitance mode, the location corresponding to a user interaction is determined based on the determined changes in the capacitance values and the piezoelectric signals.

19. The method according to claim 15, further comprising:
- determining whether a fraction of sensing electrodes corresponding to the determined changes in the capacitance values of the plurality of sensing electrodes and the magnitude of those changes in the capacitance values are inconsistent with multiple user interactions; and
- in response to a positive determination that the fraction of sensing electrodes corresponding to the determined changes in the capacitance values of the plurality of sensing electrodes and the magnitude of those changes in the capacitance values are inconsistent with multiple user interactions, operating in the force-based mode.

20. The method according to claim 15, wherein the touch panel is a button input panel.

* * * * *